US012104394B2

(12) United States Patent
Solazzo, Jr. et al.

(10) Patent No.: US 12,104,394 B2
(45) Date of Patent: Oct. 1, 2024

(54) POST REPAIR KIT AND METHOD OF REPARATION

(71) Applicants: Charles F. Solazzo, Jr., Buffalo, NY (US); David Carson, Stuart, FL (US)

(72) Inventors: Charles F. Solazzo, Jr., Buffalo, NY (US); David Carson, Stuart, FL (US)

(*) Notice: Subject to any disclaimer, the term of this patent is extended or adjusted under 35 U.S.C. 154(b) by 256 days.

(21) Appl. No.: 17/700,165

(22) Filed: Mar. 21, 2022

(65) Prior Publication Data

US 2022/0213713 A1 Jul. 7, 2022

Related U.S. Application Data

(63) Continuation-in-part of application No. 16/792,634, filed on Feb. 17, 2020, now Pat. No. 11,299,909, which is a continuation-in-part of application No. 16/403,000, filed on May 3, 2019, now abandoned.

(51) Int. Cl.

| | |
|---|---|
| ***E04H 12/22*** | (2006.01) |
| ***B25D 17/02*** | (2006.01) |
| ***E04H 17/26*** | (2006.01) |
| *B25D 11/06* | (2006.01) |
| *E04H 17/22* | (2006.01) |

(52) U.S. Cl.

CPC ......... *E04H 12/2292* (2013.01); *B25D 17/02* (2013.01); *E04H 17/261* (2013.01); *B25D 11/06* (2013.01); *B25D 2250/095* (2013.01); *B25D 2250/111* (2013.01); *E04H 17/22* (2013.01)

(58) Field of Classification Search

CPC ........... B25C 3/008; B25C 3/006; B25D 1/16; B25D 11/06; B25D 2250/095; E04H 17/26; E04H 17/261; E04H 17/22; E04H 12/2292

See application file for complete search history.

(56) References Cited

U.S. PATENT DOCUMENTS

| | | | | |
|---|---|---|---|---|
| 1,038,147 A * | 9/1912 | Johnson | E04H 12/2215 | 52/165 |
| 1,561,193 A * | 11/1925 | Spring | E04H 12/2292 | 52/297 |
| 1,584,405 A * | 5/1926 | Spring | E04H 12/2292 | 52/170 |

(Continued)

*Primary Examiner* — Jessie T Fonseca

(74) *Attorney, Agent, or Firm* — Law Office of Vincent LoTempio PLLC; Vincent G. LoTempio; Robert L. Cerasa

(57) ABSTRACT

Disclosed herein is a post repair kit comprising a stake defined by a body, proximal end, and a tapered anchor end. The post repair kit comprises a hammer mechanism comprising a power portion and a reciprocating ram structure, the power portion forcibly driving the reciprocating ram structure in a reciprocating motion. The reciprocating ram structure comprises a rod structure having a proximal end coupled with the power portion. The reciprocating ram structure further comprises an offset member connected to a distal end of the rod structure. The offset member has a first hole and a second hole. The distal end of the rod structure is connected to the first hole, wherein the offset member and the rod structure are connected perpendicular to each other. The reciprocating ram structure further comprises an interchangeable adaptor end tool detachably connected to the offset member using a fastening mechanism at the second hole.

12 Claims, 35 Drawing Sheets

(56) References Cited

U.S. PATENT DOCUMENTS

| | | | | | |
|---|---|---|---|---|---|
| 1,755,461 | A * | 4/1930 | Spring | E04H 12/2292 52/170 |
| 1,789,393 | A * | 1/1931 | Spring | E04H 12/2292 52/170 |
| 1,811,475 | A | 6/1931 | Nell | |
| 2,265,452 | A * | 12/1941 | Ruggieri | E04H 12/04 52/170 |
| 3,735,819 | A * | 5/1973 | Ramsey | B25D 1/00 173/126 |
| 4,261,424 | A | 4/1981 | Gonterman | |
| 4,296,584 | A * | 10/1981 | Lempa, Jr. | E04H 12/2292 D8/371 |
| 4,646,489 | A * | 3/1987 | Feller | E04H 12/2292 52/165 |
| 4,813,494 | A * | 3/1989 | Beard | B25D 1/12 173/91 |
| 4,951,904 | A | 8/1990 | Obenshain | |
| 5,085,281 | A * | 2/1992 | Selly | E04H 12/2215 173/132 |
| 6,079,165 | A * | 6/2000 | Bingel, III | E04H 12/2292 52/170 |
| 6,526,722 | B1 * | 3/2003 | Pangburn | E04H 12/2292 256/64 |
| D662,614 | S * | 6/2012 | Storey | D25/134 |
| D713,222 | S * | 9/2014 | Phelan | D8/1 |
| 9,308,606 | B2 | 4/2016 | Phelan | |
| 2001/0045553 | A1 | 11/2001 | Pilcher | |
| 2009/0044664 | A1 * | 2/2009 | Geisler | B25C 9/00 81/487 |
| 2012/0193111 | A1 * | 8/2012 | Lechtenberg | B25D 17/02 173/90 |
| 2019/0380282 | A1 * | 12/2019 | Burshan | E04H 12/2215 |

* cited by examiner

POST REPAIR KIT AND METHOD OF REPARATION

CROSS REFERENCE TO RELATED APPLICATIONS

This application is a Continuation-In-Part of U.S. patent application Ser. No. 16/792,634, filed on Feb. 17, 2020 and entitled POST REPAIR KIT AND METHOD OF REPARATION, which application is incorporated by reference herein in its entirety; and further this application claims the benefit of U.S. patent application Ser. No. 16/403,000, filed on May 3, 2019, and entitled POST REPAIR KIT AND METHOD OF REPARATION, which application is incorporated by reference herein in its entirety.

BACKGROUND

The invention relates generally to a post repair kit and method of reparation. More so, the present invention relates to a repair kit that provides a linear stake that juxtapositions, serving as a lateral brace, for a broken section and a new section of a post; whereby the stake defines a proximal end that couples to a hammer mechanism, and a tapered anchor end that is driven into a ground surface by the hammer mechanism; whereby the stake is driven into the ground parallel and adjacent to the broken section of the post, so as to provide lateral support to the mended junction between the broken section and a new section of post; whereby at least one fastener passes through fastener holes in the stake to fasten the stake along the mended post; and whereby the interchangeable adapter end tools attach to the reciprocating ram that drives the stake into the ground, and are used for repairing the post.

FIELD

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, wooden mailbox posts and fence posts deteriorate over time due to moisture and termite rot. This is the case, even when they are imbedded in concrete footings. Typically, the repair of the deteriorated fence posts is very difficult, time consuming and expensive. Although a fence post that has deteriorated at and below ground level can no longer support a section of fence, in most cases, the remaining portions of the post are in good condition and can still support a section of fence. Fence hardware is available for installing posts without the wooden post penetrating the surface of the ground.

Often, such wooden posts can be set directly in the ground, or, the part of the post that is below ground may be embedded in concrete. The part of the post that is below ground level, whether embedded in concrete or not, often rots resulting in the supported wood fence falling over requiring that the post be replaced or repaired. Previous repair systems and method to repair wooden posts have proven expensive, difficult to install, unsightly, or inherently weak. Therefore a need exists for a device to easily, inexpensively and durably repair an existing deteriorated wooden post such that its structural function is restored.

Other proposals have involved systems and methods to repair fence and mailbox posts. The problem with these systems and methods is that they do not allow enough space and leverage to drive a brace adjacent to the broken post. Even though the above systems and methods to repair fence and mailbox posts meet some of the needs of the market, a post repair kit and method of reparation that provides a linear stake that juxtapositions, serving as a lateral brace, for a broken section and a new section of a post, and that utilizes interchangeable adapter end tools functional for repairing the post, is still needed.

Conventional post repair kits have a stake which is inserted in the hammer mechanism and the stake is along the length/axis of the hammer mechanism. Thus, while inserting the stake into the ground and after connecting the hammer mechanism with the stake, the stake has to be maintained in a slightly bent position as there is no space for the operator to drive the hammering mechanism appropriately. Thus, during this there is a risk that the stake is damaged and also the power portion of the hammering mechanism faces lot of resistance. Further, as the stake is held in a slant direction hence after insertion into the ground the stake rather than providing support/repairing the post, might end up damaging the lower part of the post which is underground. Also, the inserted stake is not properly parallel to the post and hence it cannot possibly provide support to the post.

SUMMARY

Illustrative embodiments of the disclosure are generally directed to a post repair kit and method of reparation. The post repair kit and method of reparation is configured to juxtaposition a lateral brace to a broken section and a new section of a fence post, mailbox post, or other similar support structure. The post repair kit provides a flat stake having a proximal end that couples to a hammer mechanism having a reciprocating ram, and a tapered anchor end that drives into the ground. The stake forms at least one fastener hole towards the proximal end.

In use, the stake is aligned parallel to the broken section of the post, and a new section of the post, serving as a junction therebetween. The hammer mechanism drives the stake into the ground parallel and adjacent to the section of the broken fence post and the new portion of the post. Fasteners are driven into the fastener holes to secure the stake against the side of the post. This forms lateral support to the mended junction between broken and new sections of post. The post repair kit can use two or more stakes on opposing sides of the broken fence post to help realign and securely hold the mended post in place. A flanged stake provides additional support to adjacent posts.

In one aspect, a fence post repair kit comprises:

a stake defined by a body, proximal end, and a tapered anchor end terminating at a sharp point, the body of the stake forming three fastener holes near the proximal end, the stake being operable to align with a first section of the post;

a hammer mechanism comprising a power portion and a reciprocating ram, the reciprocating ram being defined by a ram distal end and a ram proximal end, the ram proximal end being joined to the power portion, the power portion forcibly driving the reciprocating ram in a reciprocating motion;

a plurality of interchangeable end adapter tools detachably attachable to the ram distal end, at least one of the end adapter tools forming a slot, the slot being sized and dimensioned to detachably couple to the proximal end of the stake, whereby the stake is forcibly driven in a reciprocating motion, at least one of the end adapter tools comprising a chisel point tool, at least one of the end adapter tools comprising a narrow flat chisel tool, at least one of the end adapter tools comprising a wide flat chisel tool, at least one of the end adapter tools comprising a nail remover chisel tool, at least one of the end adapter tools comprising an angled flat chisel tool;

an extension shaft terminating at opposing male threaded ends;

a connector coupler;

a shaft tool adapter terminating at machined ends;

at least one threaded screw being sized and dimensioned to pass through the fastener hole;

a fastening mechanism operable to drive the fastener through the fastener hole; and a second section of a post, whereby the body of the stake forms a junction between the first section of the post, and the second section of the post.

In another aspect, the stake comprises a metal material.

In another aspect, the at least one fastener hole is proximal to the proximal end of the stake.

In another aspect, the plurality of fastener holes comprises three fastener holes.

In another aspect, the tapered anchor end of the stake is sharp.

In another aspect, the stake comprises a flange extending longitudinally along the body.

In another aspect, the at least one fastener comprises a threaded screw.

In another aspect, the reciprocating ram comprises a threaded drill bit shank shaft.

In another aspect, the fastening mechanism comprises an electric drill.

In another aspect, the hammer mechanism comprises a masch hammer.

In another aspect, the hammer mechanism urges the stake into a ground surface.

In another aspect, the ram distal end is defined by a flat, square shape.

In another aspect, the ram distal end is defined by at least one of the following: a flat shape having a rounded terminus, a flat shape having a terminus with chamfered corners, and a flat shape having a terminus with normal corners.

In another aspect, the ram proximal end detachably attaches to the power portion of the hammer mechanism.

In another aspect, the ram distal end is detachable from the reciprocating ram.

In another aspect, the ram distal end detaches from the reciprocating ram at a threaded male shaft and a threaded female cavity.

In another aspect, the ram distal end comprises a jam nut rotatably fitted to the threaded male shaft.

In another aspect, the stake is operable to align with a first section of a post.

In another aspect, the kit further comprises a second section of the post.

In another aspect, the body of the stake forms a junction between the first section of the post, and the second section of the fence post.

In another aspect, the first section of the fence post comprises a broken post.

In another aspect, the second section of the fence post comprises a new post.

One objective of the present invention is to repair a broken fence kit by providing a brace along the length of the broken section and new section of the post.

Another objective is to drive the stake into the ground surface, parallel to the fence post.

Yet another objective is to mechanically drive the stake into the ground surface.

Another objective is to enable the stake to be driven parallel to the broken post in tight spaces.

Additional objectives are to provide mechanical means to fasten screws into the sides of the stake when fastening the stake to the post.

Another objective is to provide variously shaped ram distal ends that couple with different styles of stakes.

Yet another objective is to provide a stake with a flange for additional support.

Another objective is to provide an inexpensive method for repairing a broken post.

In another aspect, a fence post repair kit comprises:

a stake defined by a body, proximal end, and a tapered anchor end, the body of the stake comprising at least one hole at the proximal end of the stake;

a hammer mechanism comprising a power portion and a reciprocating ram structure, the power portion forcibly driving the reciprocating ram structure in a reciprocating motion; and the reciprocating ram structure comprising:

a rod structure having a proximal end coupled with the power portion an offset member connected to a distal end of the rod structure, wherein the offset member has a first hole and a second hole, wherein the distal end of the rod structure is connected to the first hole, wherein the offset member and the rod structure are connected perpendicular to each other;

an interchangeable adaptor end tool detachably connected to the offset member using a fastening mechanism at the second hole.

Yet another objective is to provide a stake that is defined by one of a flat rectangular structure, a C-shaped tubular structure, or a U shaped structure. The disclosed different stake structures help in providing additional support to the post being repair.

Yet another objective is to provide an interchangeable adaptor end tool that comprises a first plate and a second plate separated by a pre-defined gap. At least one distal edges of each of the first plate and the second plate have a slanted structure and the distal edges of each of the first plate and the second plate are not connected to each other. The proximal end of the stake is inserted in the pre-defined gap.

Yet another objective is to provide another interchangeable adaptor end tool that comprises a first plate and a second plate. The distal edge of the first plate has protrusions of pre-defined width at each corner of the distal edge. The protrusions are in contact with the second plate thereby forming a rectangular gap between the first plate, the second plate and the protrusions. The proximal end of the stake is inserted in the rectangular gap.

Yet another objective is to provide another interchangeable adaptor end tool comprises a first plate and a second plate. The distal edge of the first plate has protrusions of pre-defined width at each corner of the distal edge and another protrusion of a pre-defined width at a center portion of the first plate. The protrusions at each corner of the distal edge have a width greater than the protrusion at the center portion of the first plate. The protrusions at each corner of the distal edge form a gap between the first plate and the second plate. The first plate has a E shaped structure when looked from a bottom side of the first plate and the proximal end of the stake is inserted in the gap.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 5A shows a front view of exemplary fasteners fastening the stake into the fence post, and FIG. 5B shows a perspective view of the post driven into the ground surface with a side view close up of the stake fully engaged with the post, in accordance with an embodiment of the present invention;

FIG. 8A shows the stake with a close up view of the sharp terminus, FIG. 8B shows a perspective view of the flanged stake, and FIG. 8C shows an elevated side view of the flanged stake, in accordance with an embodiment of the present invention;

FIG. 9A shows a side view of the reciprocating ram, FIG. 9B shows an exemplary ram distal end, FIG. 9C shows a slot formed in the ram distal end, FIG. 9D shows a sectioned view of the ram distal end, the section taken along section 9D-9D of FIG. 9C, detailing an adapter for the detachable ram distal end, and FIG. 9E shows an exemplary adapter for the detachable ram distal end, in accordance with an embodiment of the present invention;

FIG. 10A shows the proximal end of the stake and the end adapter tool with square ends, FIG. 10B shows the proximal end of the stake and the end adapter tool with rounded ends, and FIG. 10C shows the proximal end of the stake and the end adapter tool with angled ends, in accordance with an embodiment of the present invention;

FIG. 11A shows an exemplary SDS shaft tool adapter having a male threaded adapter end with round machine surface, FIG. 11B shows a two-step threaded male adapter having round machine surface, FIG. 11C an alternative SDS shaft tool adapter having a male threaded adapter end with round machine surface, and FIG. 11D shows a two-step threaded male adapter having round machine surface, in accordance with an embodiment of the present invention;

FIG. 15A shows a top view, FIG. 15B shows an isometric view, and FIG. 15C shows a sectioned view of the SDS connecter coupler, the section taken along section 15C-15C of FIG. 15B, detailing the connector coupler receiving angled male threaded ends, in accordance with an embodiment of the present invention;

FIG. 16A shows a top view, FIG. 16B shows an isometric view, and FIG. 16C shows a sectioned view of the SDS connecter coupler, the section taken along section 16C-16C of FIG. 16B, detailing the connector coupler receiving angled male threaded ends, in accordance with an embodiment of the present invention;

FIG. 17A shows a top view, FIG. 17B shows an isometric view, and FIG. 17C shows a sectioned view of the SDS connecter coupler, the section taken along section 17C-17C of FIG. 17B, detailing the connector coupler receiving rounded male threaded ends, in accordance with an embodiment of the present invention;

FIG. 18A shows a top view, FIG. 18B shows an isometric view, and FIG. 18C shows a sectioned view of the SDS connecter coupler, the section taken along section 18C-18C of FIG. 18B, detailing the connector coupler receiving angled male threaded ends, in accordance with an embodiment of the present invention;

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
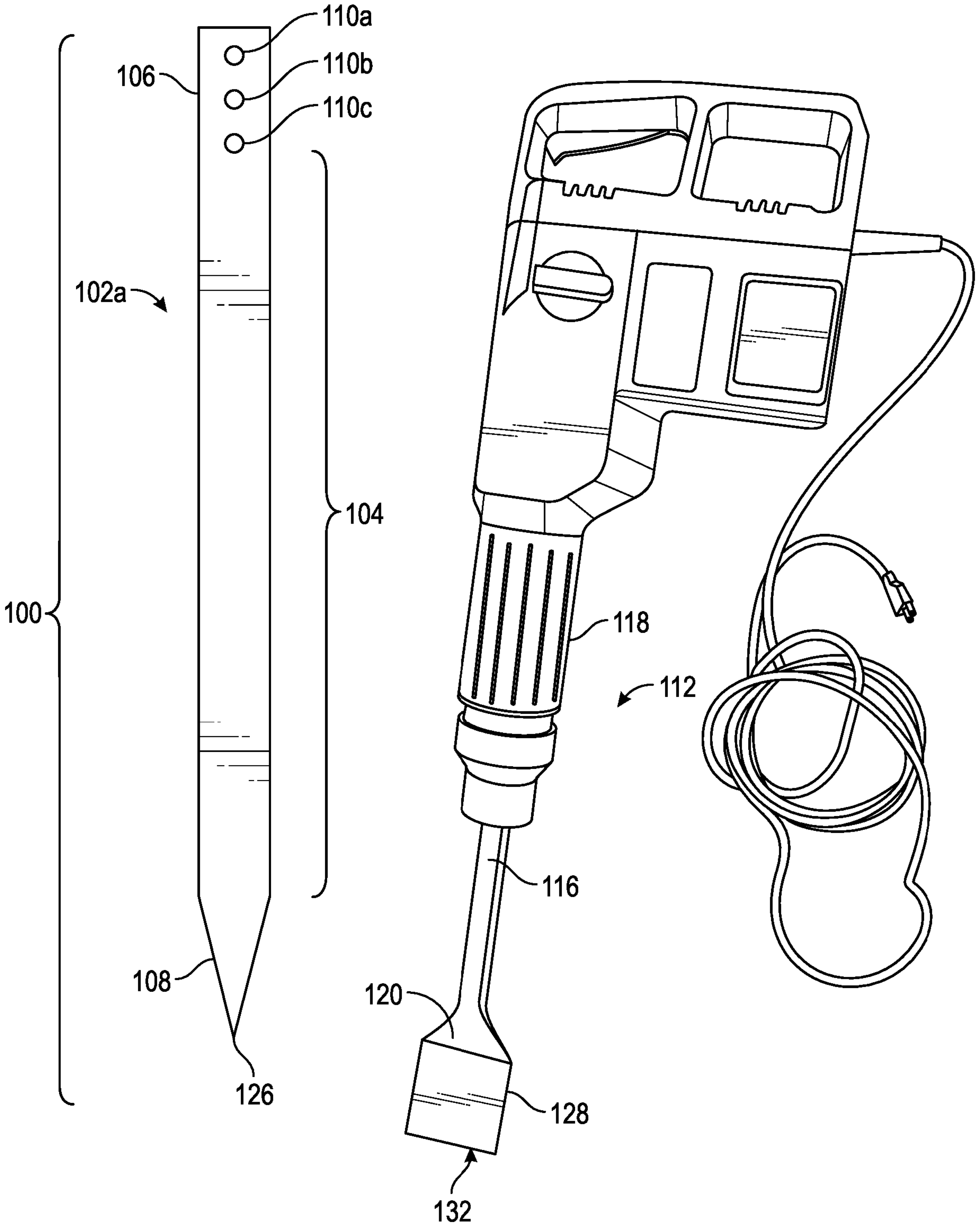
FIG. 1 illustrates a perspective view of an exemplary post repair kit, showing a stake, a hammer mechanism, and a fastening mechanism, in accordance with an embodiment of the present invention.

A post repair kit 100 and method 2000 of reparation is referenced in FIGS. 1-29. Post repair kit 100, hereafter "kit 100" provides multiple fastening components and tools that work together as a mobile, efficient solution to repair a post 300. As FIG. 1 illustrates, kit 100 leverages the use of at least one linear stake 102*a*, 102*b* to brace a broken section and a new section of the post 300, by driving the stake 102*a-b* from an adjacent position to be parallel and fully engaged along the longitudinal of post 300.

Thus, the stake 102*a-b* juxtapositions to a broken section and a new section of the post 300. Stake 102*a* can be fit in tight spaces, and driven with sufficient leverage so that stake 102*a* can be driven into ground surface, adjacent and parallel to stake. Kit 100 also provides a hammer mechanism 112 drives the stake 102*a* deep into the ground surface 302 with sufficient leverage to enable driving in a tight space. In this manner, stake 102*a* is driven into ground surface 302 to create lateral stability to the broken post.

Distal end 120 of hammer mechanism 112 is adaptable to receive a plurality of interchangeable end adapted tools 128, 1900*a-e*. At least one of the end adapted tools 128 forms a slot sized and dimensioned to detachably couple to a proximal end 106 of stake 102*a*. Other tools 1900*a-e* are configured for general post mending tasks, such as removing nails, cutting, shaving wood, and hammering. In one embodiment, end adapter tool 128 is welded, i.e., permanently fixed, to ram distal end, as shown in FIG. 1.

Furthermore, kit 100 also provides a fastening mechanism 124 that drives at least one fastener 122*a*, 122*b* through fastener holes 110*a-e* in stake 102*a*, so as to secures stake 102*a* to the sides of post 300 for additional stability. In some embodiments, post 300 may include a fence post, or other linear members used as barriers or to hold up objects, such as mailbox posts, gates, foundations studs, door jambs, wood posts are set in the ground to support wood fences, and sections of a wooden frame.

Figure 2:
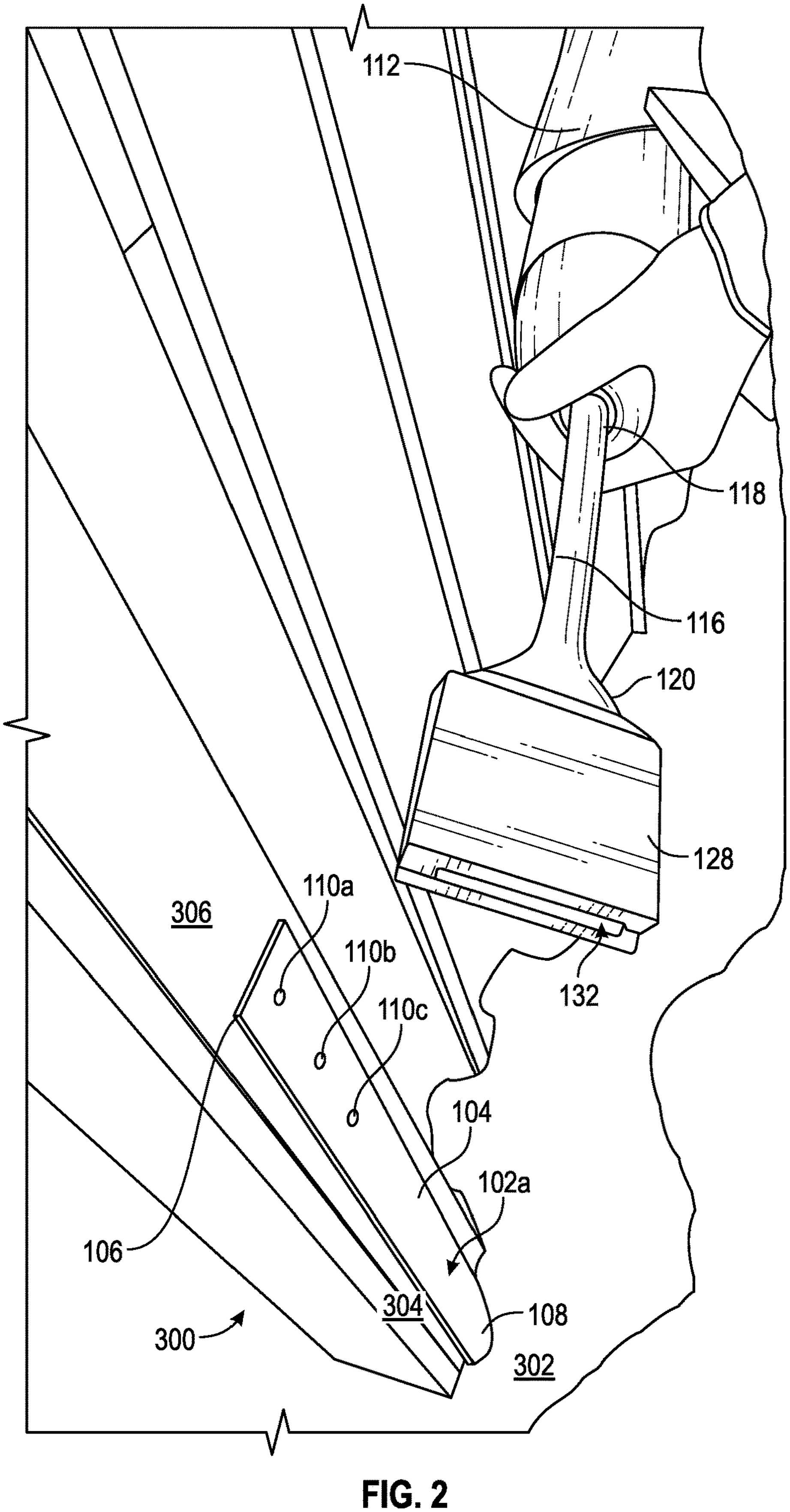
FIG. 2 illustrates a perspective view of the stake, aligned with a first section of the post in preparation for anchoring into the ground surface, in accordance with an embodiment of the present invention.

Looking now at FIG. 2, kit 100 comprises a stake 102*a* that serves as a brace between a first section 304 and a second section 306 of the post 300. Stake 102*a* juxtapositions between the sections 304, 306 along the longitudinal to repair the broken post. In some embodiments, two or more stakes 102*a*, 102*b* on opposing sides of the broken post are used to realign and hold the mended post in place.

Figure 4:
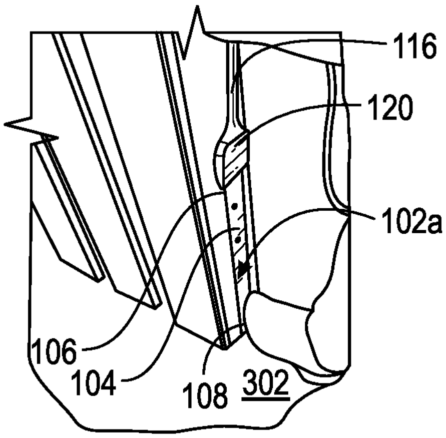
FIG. 4 illustrates a perspective view of the hammer mechanism driving the stake into the ground surface, in accordance with an embodiment of the present invention.
Figure 5B:
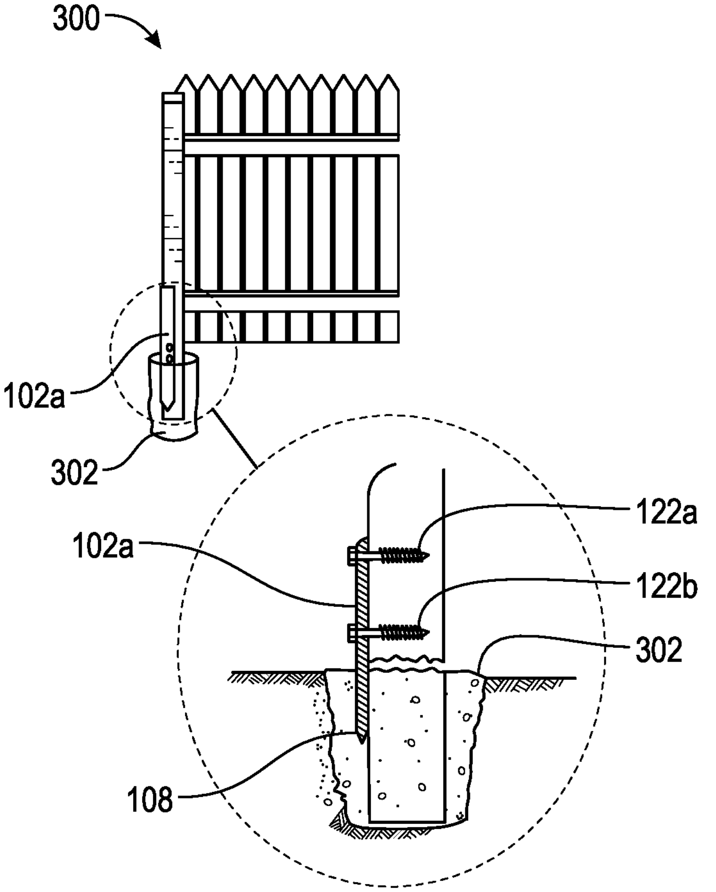
FIGS. 5A and 5B illustrate an exemplary stake penetrated into the ground surface, where
Figure 5A:
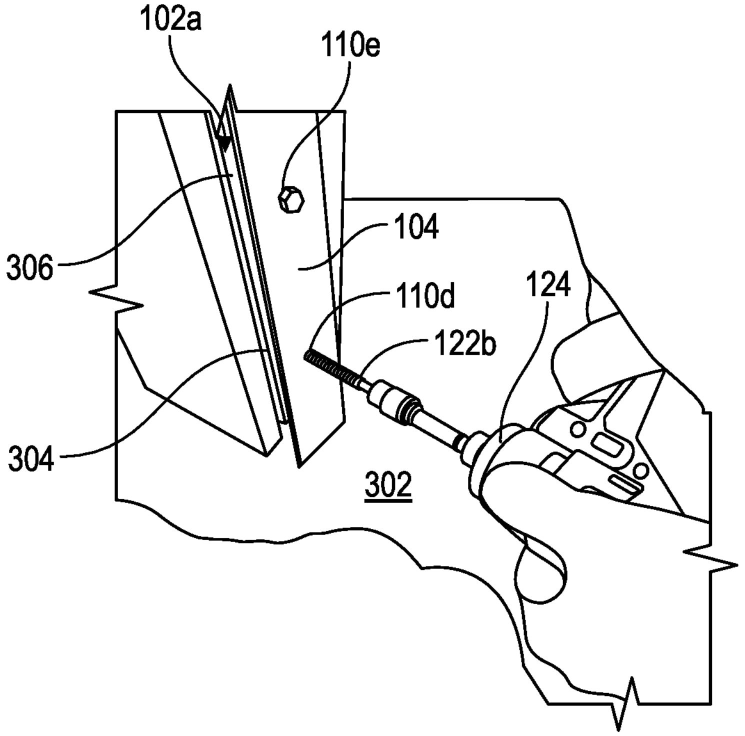
Figure 8A:
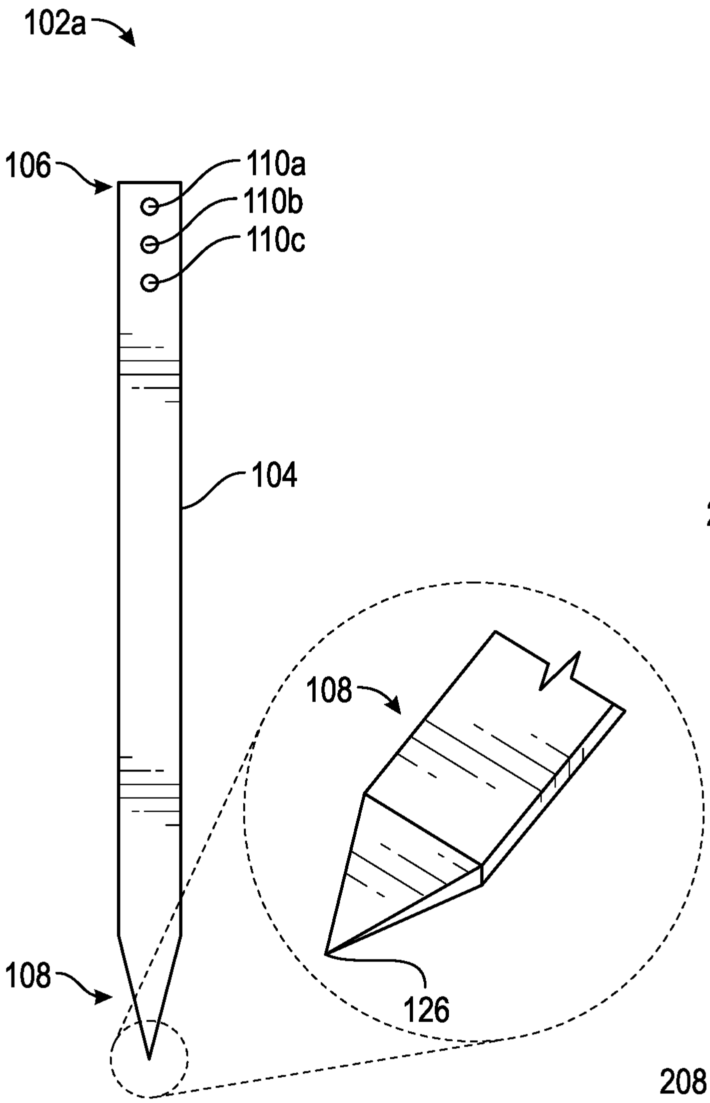
FIGS. 8A-8C illustrate an exemplary stake with fastener holes, where

As FIG. 8A shows, stake 102*a-b* is defined by a body 104 that extends longitudinally. Body 104 terminates at a proximal end 106 and a tapered anchor end 108 that terminates at a sharp point 126. Body 104 of stake 102*a-b* forms at least one fastener hole 110*a-e* (FIG. 5A). In some embodiments, fastener hole 110*a-e* is near proximal end of stake 102*a-b*. Tapered anchor end 108 of stake 102*a* forms a sharp point 126 that helps drive body 104 into the ground surface 302. Looking at FIG. 3, stake 102*a* is configured to lie adjacent and parallel to a first section of post. For example, FIG. 4 illustrates a perspective view of the stake 102*a* aligned with the post 300 in preparation for being driven into the ground surface 302. Fastener hole 110*a-e* forms near the proximal end of stake 102*a-b*.

Looking again at FIG. 1, fastener hole 110*a-e* comprises three fastener hole 110*a*, 110*b*, 110*c* arranged in a linear, spaced-apart arrangement across the longitudinal. Fastener hole 110*d*, 110*e* may also be disposed at anchor end 108 of stake 102*a* in some embodiments. In one embodiment, a first fastener hole 110*a* is about 1" from terminus of proximal end; a second fastener hole 110*b* is about 3" from terminus of proximal end 106; and a third fastener hole 110*c* is about 7" from terminus of proximal end.

In one possible embodiment, stake 102*a*, 102*b* is an angle-iron fabrication. Though other materials may also be used, including iron, steel, aluminum, and a rigid polymer. In one embodiment, stake 102*a-b* is about 32" long, and 2" wide. Tapered section of anchor end 108 may be about 3½" long. Stake 102*a-b* may also have a 7 cage thickness in one embodiment.

Figure 8B:
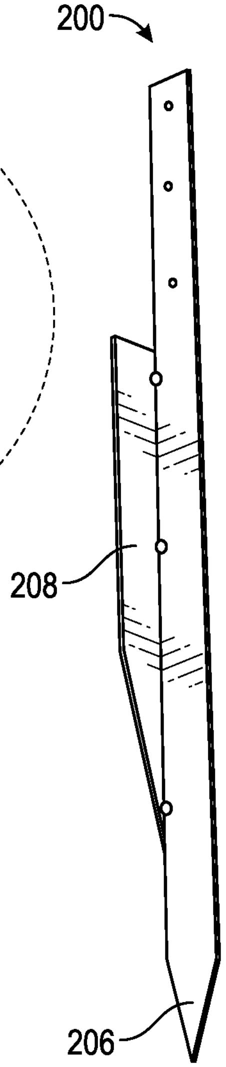
Figure 8C:
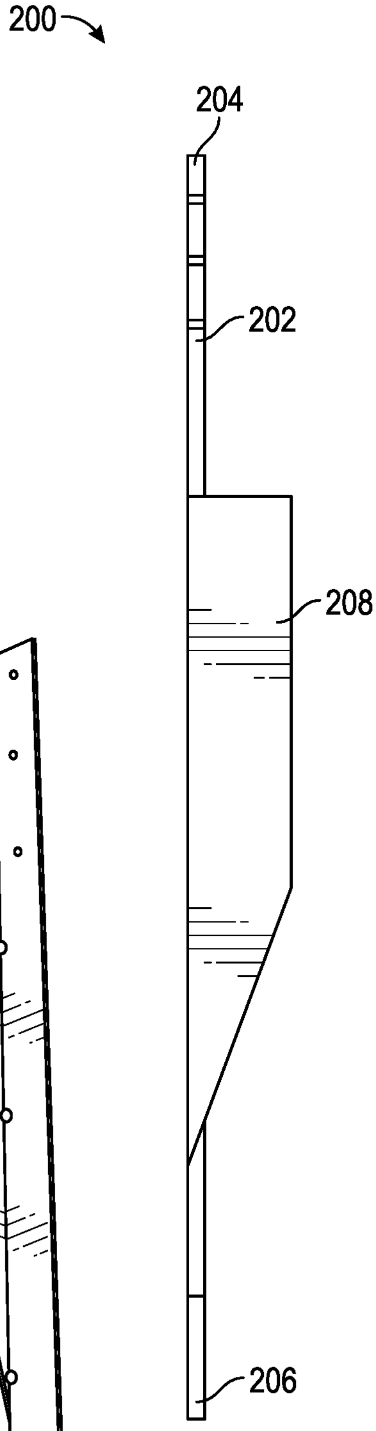

As shown in FIG. 8B, kit also provides an alternative flanged stake 200. Flanged stake is similar to above-described stake 102*a*, except that flanged stake 200 is configured with a flange 208 that extends longitudinally along a body 202 (FIG. 8C). Flange 208 centrally positions between a proximal end 204 and an anchor end 206. In one embodiment, flange 208 is disposed along a central axis of the body 202. The flange 208, as shown in the illustration FIG. 7, can be used to support an adjacent post in a parallel disposition to the repaired post. Flanged stake 200 forms three fastener holes 210*a*, 210*b*, 210*c* along body 202. In one non-limiting embodiment, flanged stake 200 is about 32" long, and 2" wide. Flange 208 is about 24" long and tapers down at 12". Tapered section of anchor end 206 may be about 3½" long.

Looking at FIG. 4, kit 100 also provides a hammer mechanism 112. Hammer mechanism 112 drives the stake 102*a-b* into the ground parallel and adjacent to a first section 304 (broken section of the post) and a second portion 306 (new section of the post). In one embodiment, hammer mechanism 112 urges the stake 102*a* deep into the ground surface 302, such that at least half the body 104 of the stake 102*a* is subterranean. This works to anchor stake 102*a*, and the attached post 300 more firmly together.

In one embodiment, hammer mechanism 112 comprises a power portion 114 that couples to a reciprocating ram 116. Power portion 114 drives reciprocating ram 116. Reciprocating ram 116 detachably mates to stake 102*a-b*, such that hammer mechanism 112 drives stake 102*a* adjacent and parallel to first and second sections 304, 306 of post 300. Reciprocating ram 116 is defined by a ram proximal end 118 and a ram distal end 120. Ram proximal end 118 joins to power portion 114 of hammer mechanism 112.

Ram proximal end 118 detachably attaches to power portion 114 of hammer mechanism 112. This attachment can be through a friction fit coupling, a threaded coupling, or a pressure-fit coupling with hammer mechanism 112. In one embodiment, a drill chuck or other coupling member helps fasten ram proximal end 118 and hammer mechanism 112.

Figure 9A:
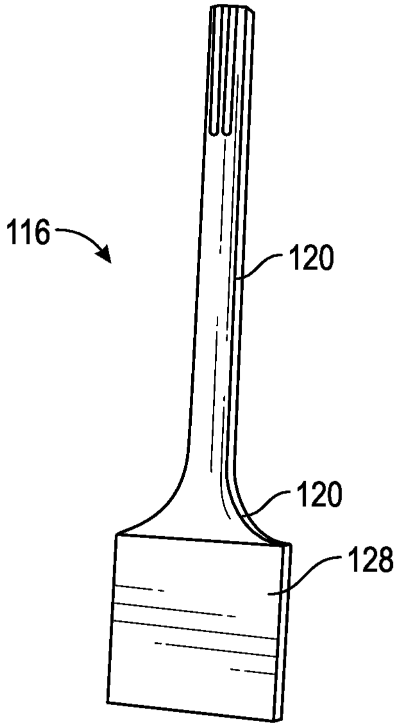
FIGS. 9A-9E illustrate an exemplary reciprocating ram, where
Figure 9B:
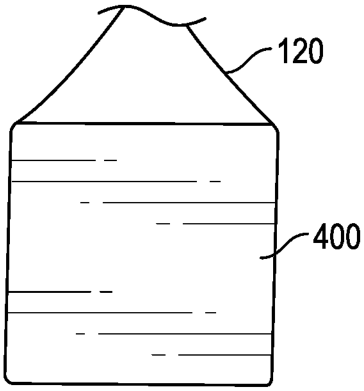
Figure 9C:
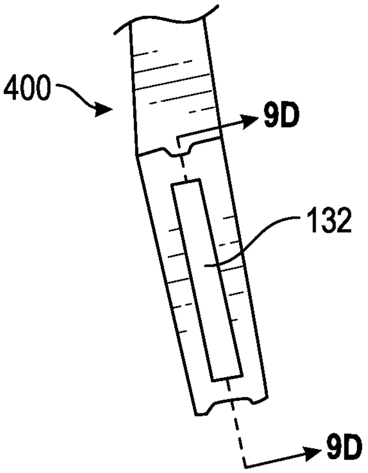
Figure 9D:
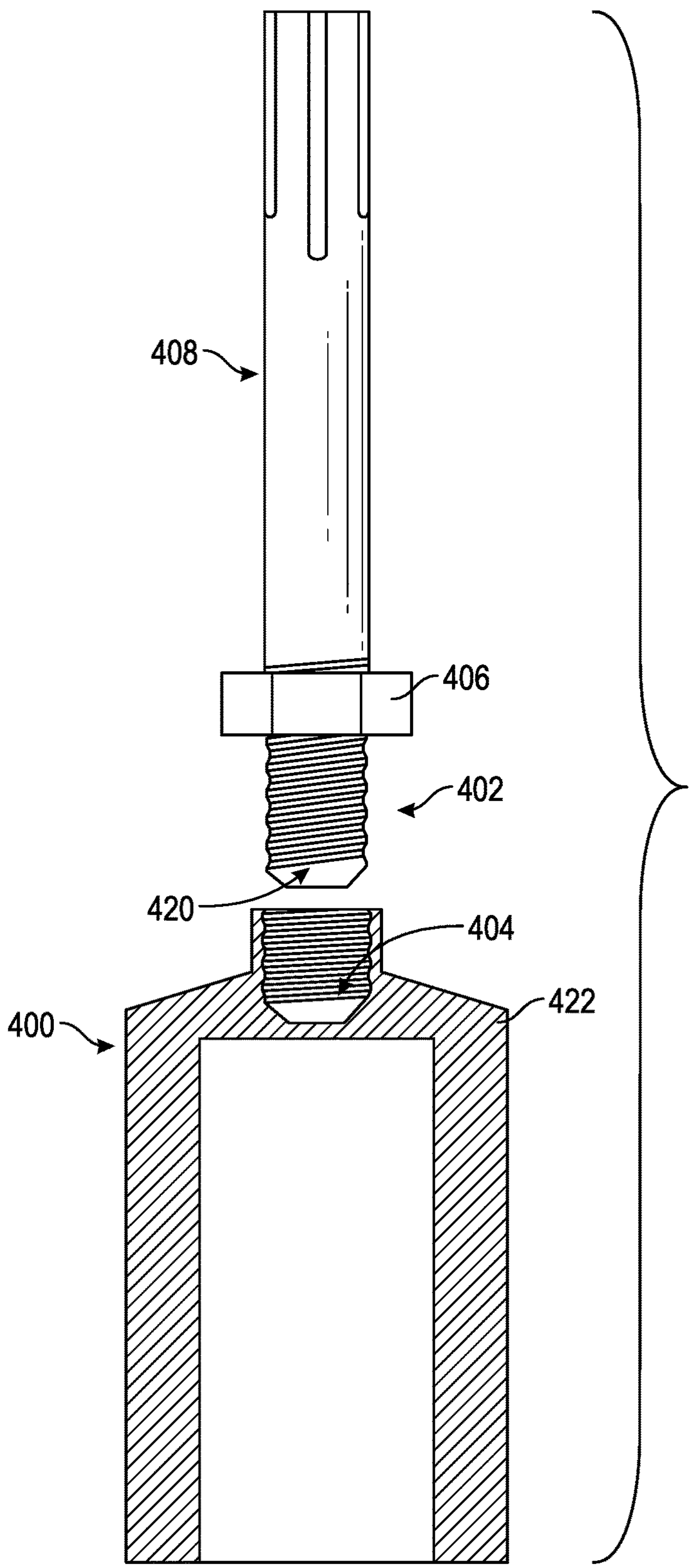
Figure 12:
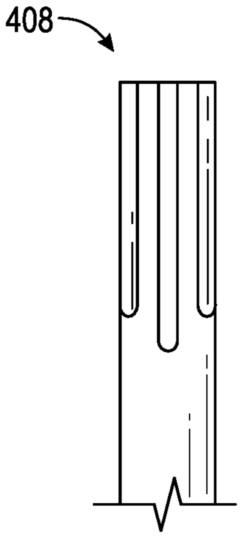
FIG. 12 illustrates an SDS machined end for receiving a hammer drill, in accordance with an embodiment of the present invention.

Looking now at FIG. 9D, another embodiment of an end adapter tool 400 is configured to detach from distal end of reciprocating ram, or in this embodiment, a Slotted Drive System (SDS) shaft 408. FIG. 12 illustrates the terminus of SDS shaft 408 that is machined for receiving a hammer drill. The detachability that SDS shaft allows is effective for detachably connecting multiple tools in an interchangeable configuration.

Figure 9E:
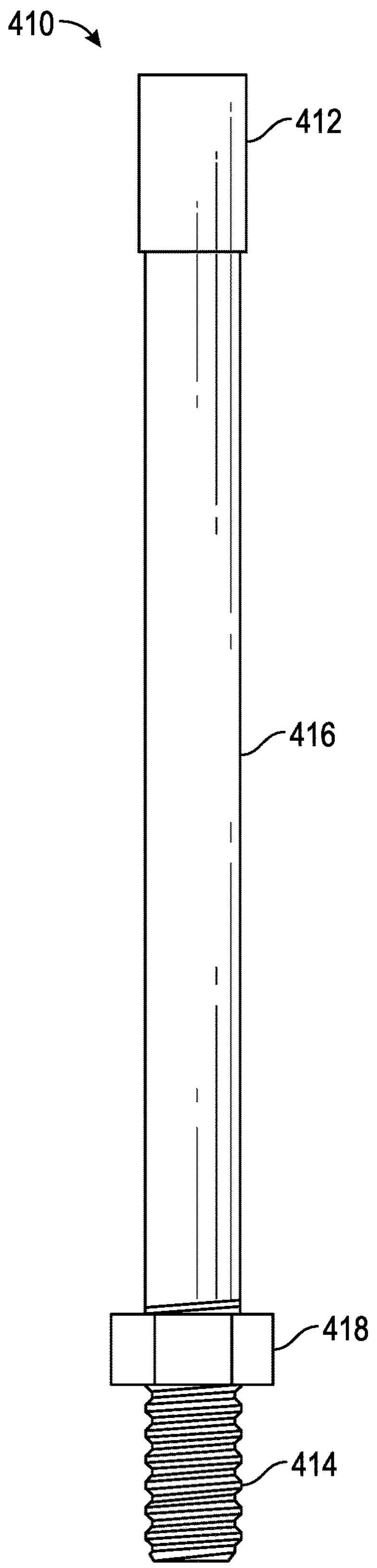

Though as shown back in FIG. 9A, end adapter tool 128 is welded, and thereby fixed to the ram distal end 120 of reciprocating ram 116. FIGS. 9B and 9C show the welded version of end adapter tool 128 forming a slot to receive the stake. Nonetheless, in the detachable configuration, the end adapter tool 400 detaches from SDS shaft 408 at an adapter 422 having a threaded female cavity 404 to receive a threaded male shaft 402 at the terminus of SDS shaft 408. A jam nut 406 is rotatably fitted to the threaded male shaft 402 for enhancing the connection between end adapter tool 400 and SDS shaft 408 (FIG. 9E).

Figure 11A:
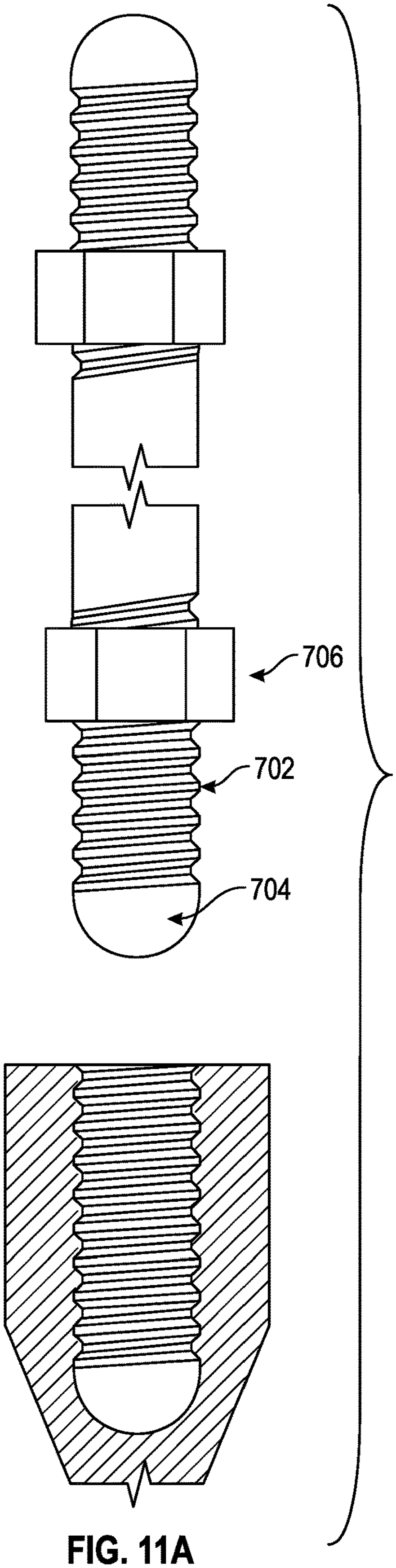
FIGS. 11A-11D illustrate an exemplary SDS shaft tool adapter, where
Figure 11B:
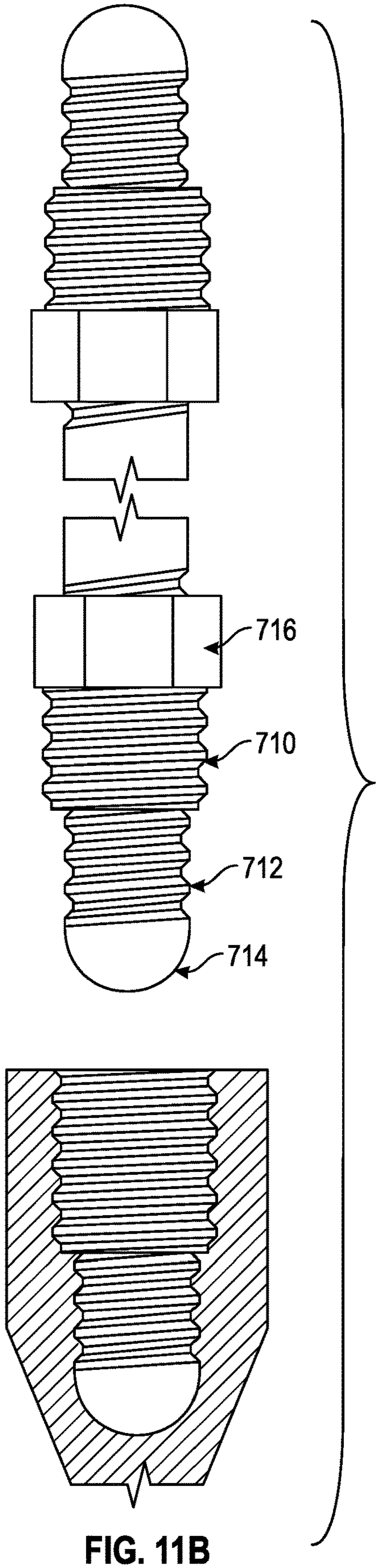
Figure 11C:
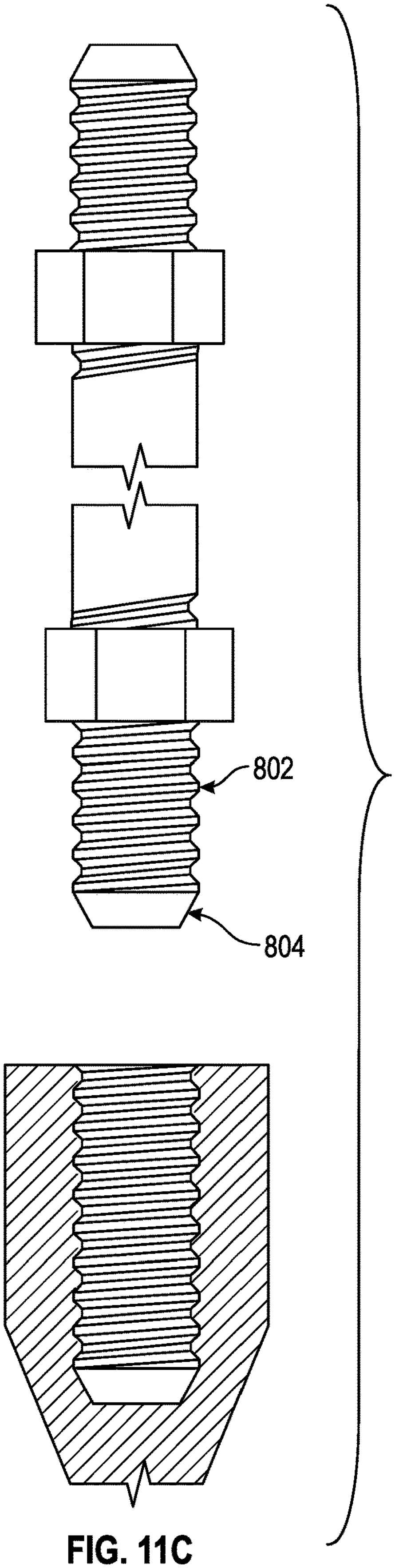
Figure 11D:
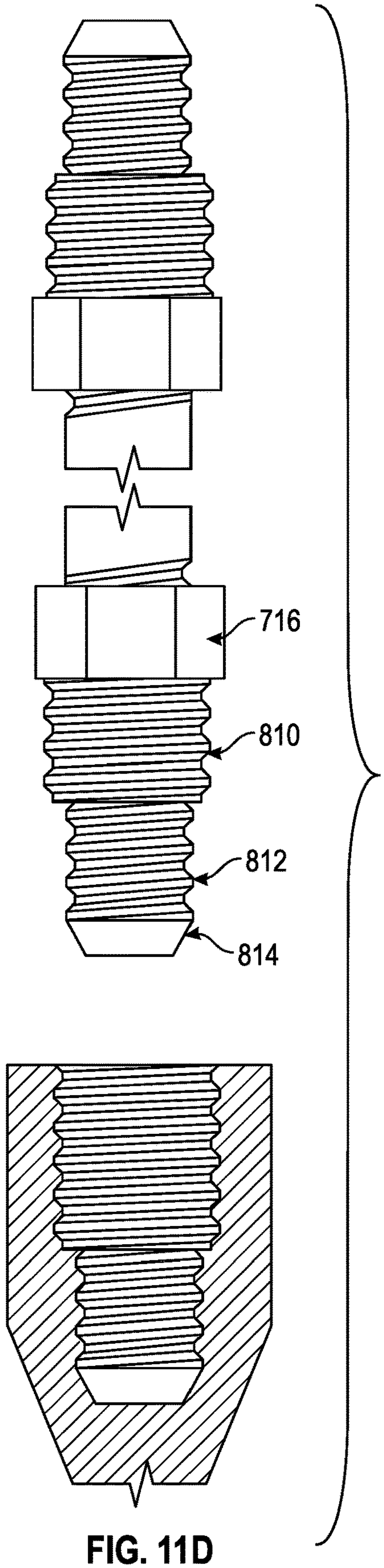

Further, as shown in FIGS. 11C and 11D, threaded male shaft 402 may have a chamfered, or angled flat machine surface 420 for proper mating and seating with threaded female cavity 404. However in other embodiments, a round machined surface or other coupling mechanisms may be used. Thus, because a slot forms in end adapter tool 400 detachably couples to proximal end 106 of stake 102*a*, SDS shaft 408 drives stake into ground surface 302 while being forcibly driven in a reciprocating motion by hammer mechanism 112.

In some embodiments, the power portion 114 of hammer mechanism 112 works to forcibly drive SDS shaft 408 in a reciprocating motion. Power portion 114 may include an electrical motor, a housing, and a drill chuck that receives ram proximal end 118 of the reciprocating ram 116. In one non-limiting embodiment, hammer mechanism 112 comprises a masch hammer. The reciprocating ram 116 may also be a threaded drill bit shank shaft slotted drive system 408 (SDS). The use of SDS shaft 408 with the masch hammer to drive the stake 102*a*, adjacent to the broken fence pole is an improvement and facilitates the operation over the prior art of directly and manually hammering the stake into the ground surface 302.

Continuing with the detachable capacity, FIGS. 11A and 11B reference an extension adapter 410 that can be used with SDS shaft 408 and end adapter tool 400. Extension adapter 410 includes a female threaded adapter end 412 to receive the male end of SDS shaft 408. Adapter 410 also includes an extension 416 that terminates at a male threaded end 414 and a jam nut 418. Male threaded end 414 is useful for connecting to end adapter tool 400 and other types of end adaptor tools used to drive the stake 102 into the ground surface 302 and repair the post 300.

Figure 10C:
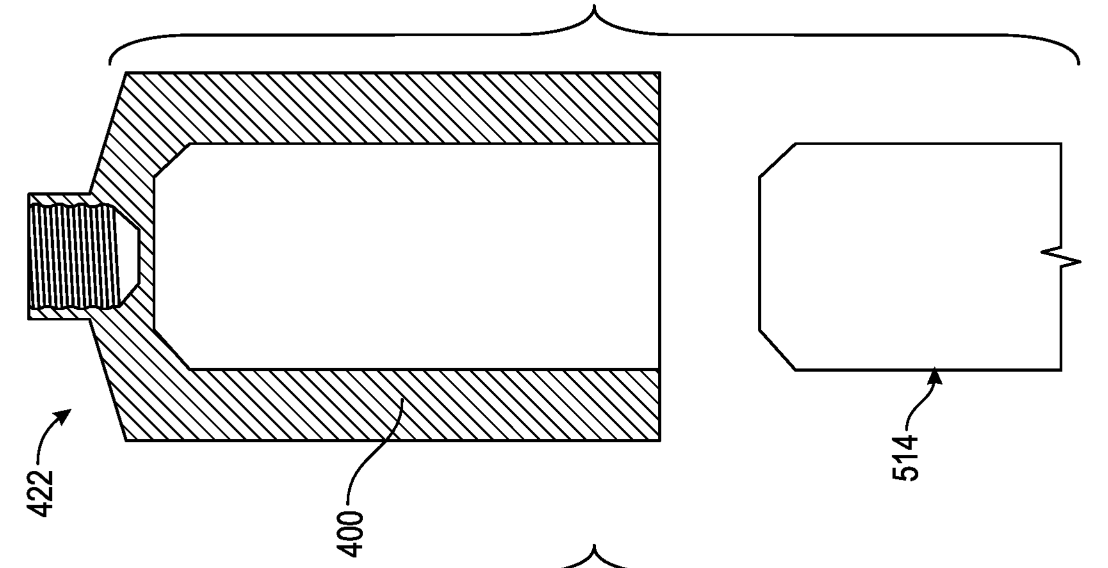
FIGS. 10A-10C illustrate exemplary reciprocating rams, adapters, end adapter tools, where
Figure 10B:
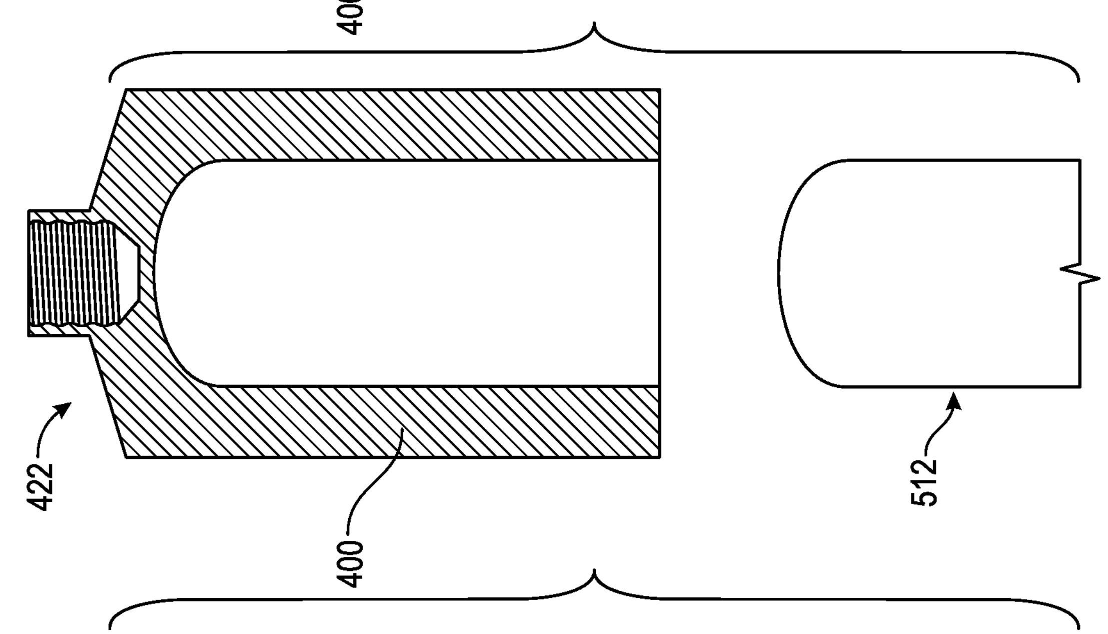
Figure 10A:
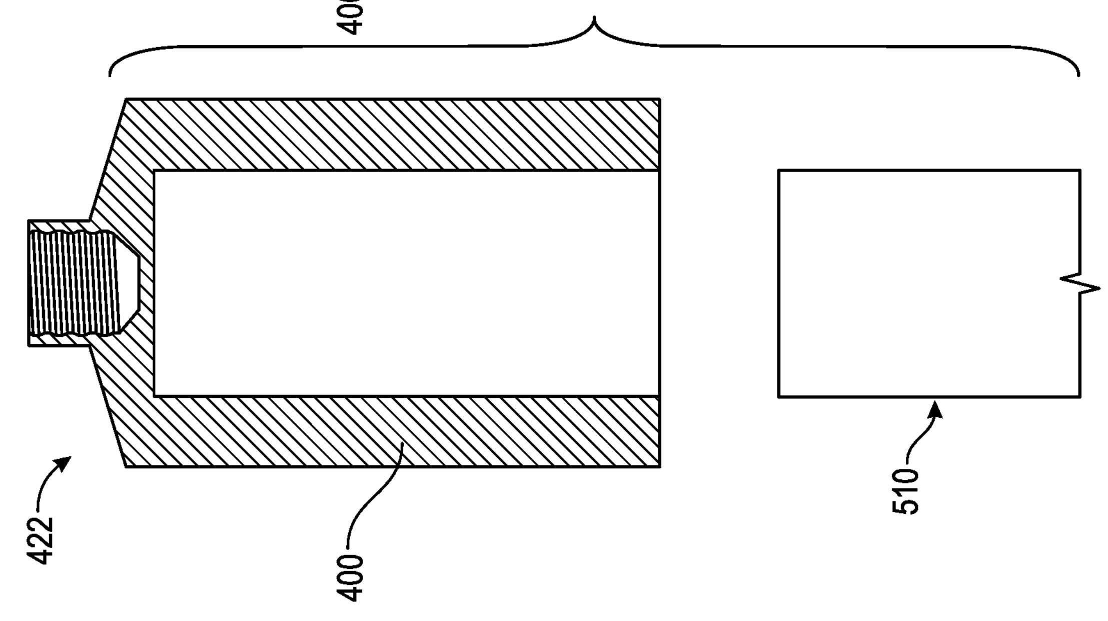

Turning now to FIGS. 10A-10C, the kit 100 is unique in that multiple end adapter tools can detachably attach to ram distal end 120 of reciprocating ram 116 or SDS shaft 408. The end adapter tools are defined by numerous shapes and dimensions, with each shape providing a unique advantage for mending posts. In one embodiment illustrated in FIG. 10A, a square corner connection tool 500 defines a flat shape having a slotted terminus and square corners 502. Square corner connection tool 500 is adapted to receive a square corner proximal end 510 of stake 102*a*.

In another embodiment shown in FIG. 10B, a round corner connection tool 504 defines a flat shape having a slotted terminus and round corners 506. Round corner connection tool 504 is adapted to receive a round corner proximal end 512 of stake 102*a*. In yet another embodiment depicted in FIG. 10C, an angled corner connection tool 508 defines a flat shape having a slotted terminus and chamfered, or angled corners. Angled corner connection tool 508 is adapted to receive an angled corner proximal end 514 of stake 102*a*. Though in other embodiments, end adapter tools may have different shapes and dimensions since stake 102*a* is scalable in size and dimension to accommodate variously sized and shaped posts. In yet another embodiment, the connection tool may have a V-shape mating surface for use with the above-described, and any future use of the interchangeable tools.

As referenced in FIGS. 19A-19E, a plurality of interchangeable end adapted tools 1900*a-e* detachably attachable to the ram distal end 120 or reciprocating ram 116 or connector couplers 1100, 1200, described below. At least one of the end adapter tools 128 forms a slot 132 that is sized and dimensioned to detachably couple to the proximal end 106 of the stake 102*a*. Slot 132 may be elongated and have a ridge to securely retain the flat, proximal end 106 of stake 102*a-b*. In this coupling arrangement, a snug fit occurs between ram distal end 120 and proximal end 106 of the stake 102*a-b*. In one embodiment, ram distal end 120 widens out from reciprocating ram 116, forming a generally square shape (FIG. 1). Though, as shown in FIGS. 10B and 10C, ram distal end and mating end adapter tool can have other shapes.

Figure 19A:
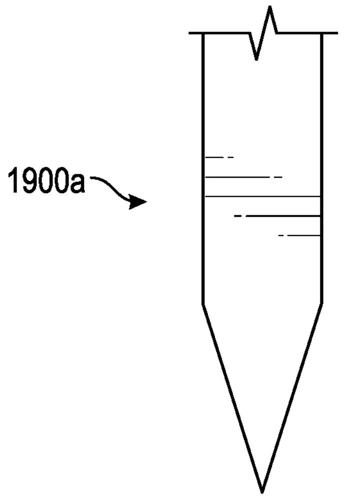
FIGS. 19A-19E illustrates a plurality of end adapter tools used for adaptive interchange with an SDS shaft and a coupler, in accordance with an embodiment of the present invention.

FIGS. 19A-19E illustrates a plurality of end adapter tools used for adaptive interchange with an SDS shaft and a coupler. Thus, a plurality of end adapter tools 1900*a-e* are used for adaptive interchange with reciprocating ram 116 and SDS shaft 408. Each end adapter tool 1900*a-e* is defined by a threaded male adapter 602 and a nut 604 that enable connectivity with reciprocating ram 116 and SDS shaft 408. End adapter tool 1900*a-e* are configured to perform various post repair functions, such as removing nails, shaving wood, hammering, and the like. For example a chisel point end adapter tool 1900*a* can be used for stabbing and shaving posts to prepare for receiving stake 102*a* (FIG. 19A). Chisel point adapter tool is also effective for aligning stake against post, as shown in FIG. 4.

Figure 19B:
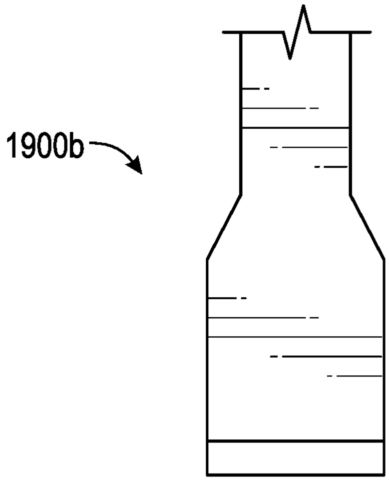
Figure 19C:
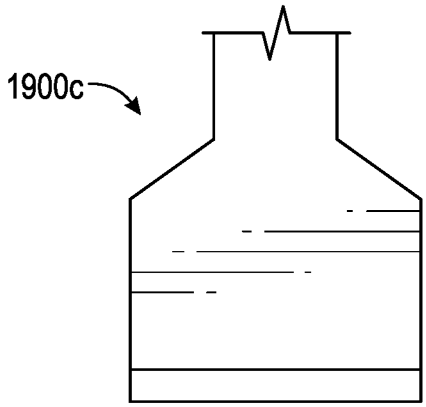
Figure 19D:
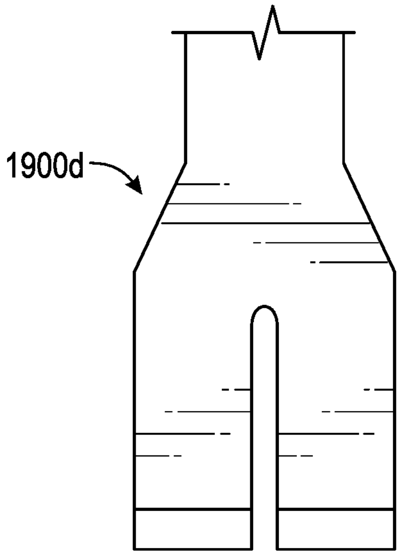
Figure 19E:
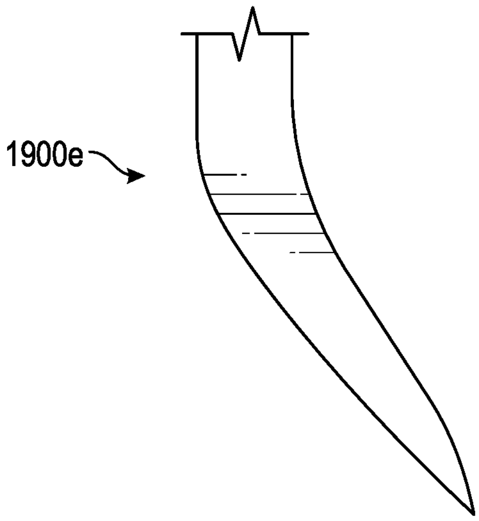

Continuing with the end adapter tools, a narrow flat chisel tool 1900*b* is used for shaving and cleaning posts in preparation for the stake to be aligned against the post, and also to help align stake against post (FIG. 19B). In another example, FIG. 19C illustrates a wide flat chisel tool 1900*c* is utilized to shave posts in preparation for the stake to be aligned against the post. A nail remover chisel tool 1900*d* is functional to remove nails from post and shave post (FIG. 19D). In yet another example shown in FIG. 19E, an angled flat chisel tool 1900*e* is used to cut and shave post, and also to help align stake against post.

End adapter tools 1900*a-e* may utilize different connectivity means. Each end adapter tool 1900*a-e* is defined by a threaded female end 606 that is configured to enable entry of a two-step threaded male adapter that includes a threaded wide portion 608 and a threaded narrow portion 610. This creates a connectivity means that eliminates need for the coupling or coupler. Two-step threaded male end can terminate at a round machined surface 612 or an angled flat machine surface 614 for proper seating with a female couch.

It is known in the art that adapters, extensions, couplers, and other connectivity mechanisms are necessary to detachably attach end adapter tools to reciprocating ram 116 and SDS shaft 408. One possible type of adapter, shown in FIGS. 11A-11D, comprises an SDS shaft tool adapter 700 that is used with the interchangeable end adapter tools 128, 1900*a-e*. SDS shaft tool adapter 700 has an SDS machined end 708 for receiving a hammer drill. FIGS. 11A and 11B illustrate a threaded male end shaft 702 that enables detachable attachment to the end adapter tools 128, 1900*a-e*.

In one possible embodiment, threaded male end shaft 702 terminates at a round machine end for proper mating and seating with tool (FIG. 11A). In another embodiment, a two-step threaded male adapter having a wide section 710 and a narrow section 712 terminates at a round machine end 714 for proper mating and seating with end adapter tool (FIG. 11B). A jam nut 716 may also be used to tighten the shaft after shaft is seated in coupling base or tool base.

In a modification of SDS shaft extension adapter, an alternative SDS shaft tool adapter 800 is used with the interchangeable end adapter tools 128, 1900*a-e*. SDS shaft tool adapter 800 has an SDS machined end 808 for receiving a hammer drill. FIG. 11C shows a threaded male SDS end shaft 802 enables detachable attachment to the end adapter tools 128, 1900*a-e*.

In one possible embodiment, threaded male end shaft 802 terminates at an angled machine end 804 for proper mating and seating with tool (FIG. 11D). In another embodiment, a two-step threaded male adapter having a wide section 810 and a narrow section 812 terminates at an angled machine end 814 for proper mating and seating with end adapter tool. A jam nut 816 may also be used to tighten the shaft after shaft is seated in coupling base or tool base.

Figure 13:
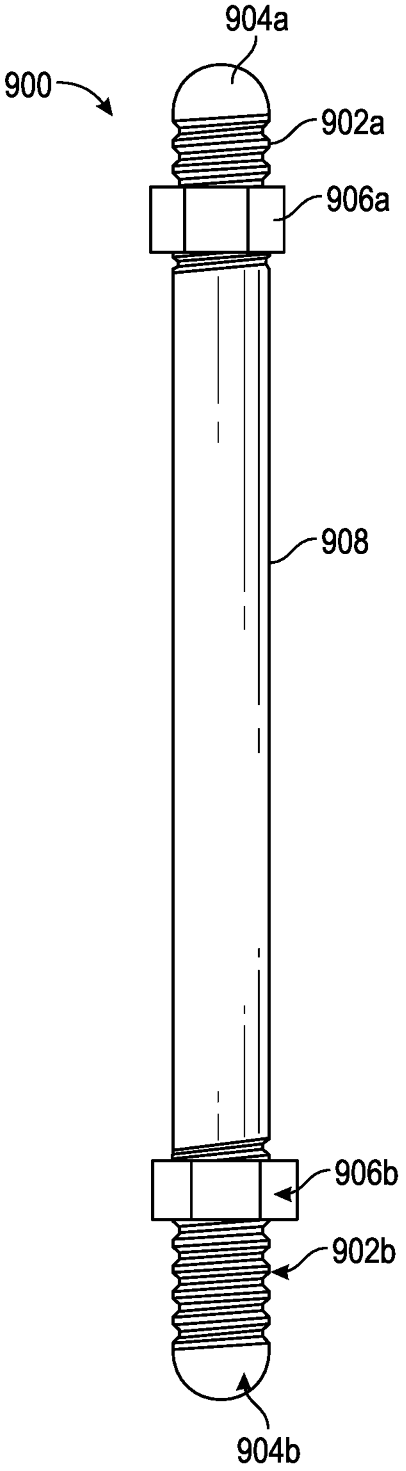
FIG. 13 illustrates an exemplary SDS extension shaft used with the reciprocating ram and the interchangeable end adapter tools, in accordance with an embodiment of the present invention.

It is also known in the art that extending the length of reciprocating ram 116 may be necessary, such as when driving stake 102*a-b* into deep holes. FIG. 13 illustrates an SDS extension shaft 900 that is used with the reciprocating ram 116 and SDS shaft 408. The SDS extension shaft 900 creates greater length, and interchangeability for the end adapter tools 128, 1900*a-e*. SDS extension shaft 900 is defined by an elongated body 908 terminating at opposing male threaded ends 902*a*, 902*b*. Male threaded ends 902*a-b* terminate at round machine ends 904*a*, 904*b*, which help in proper mating and seating with reciprocating ram, SDS shaft, and end adapter tools. A jam nut 907*a*, 906*b* on each end of SDS extension shaft 900 may also be used to tighten body 908 of SDS extension shaft 900 after being seated in coupling base or tool base.

Figure 14:
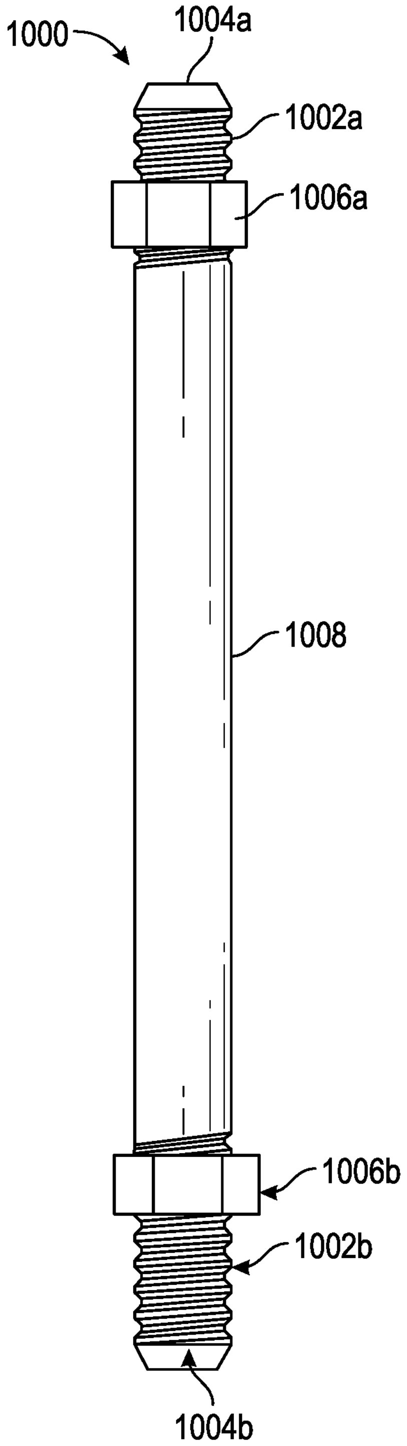
FIG. 14 illustrates an exemplary angled-end SDS shaft extension shaft used for detachable and interchangeable connectivity with reciprocating ram and the interchangeable end adapter tools, in accordance with an embodiment of the present invention.

In a variation of SDS extension shaft 900, FIG. 14 illustrates an exemplary angled-end SDS shaft extension shaft 1000 used for detachable and interchangeable connectivity with reciprocating ram 116 and the interchangeable end adapter tools 128, 1900*a-e*. Angled-end SDS extension shaft 1000 is defined by an elongated body 1008 terminating at opposing male threaded ends 1002*a*, 1002*b*. Male threaded ends 1002*a-b* terminate at round machine ends 1004*a*, 1004*b* for proper mating and seating with reciprocating ram and end adapter tools. A jam nut 1007*a*, 1006*b* on each end 1002*a-b* may also be used to tighten body 1008 of angled-end SDS shaft extension shaft 1000 after being seated in coupling base or tool base.

Figure 15A:
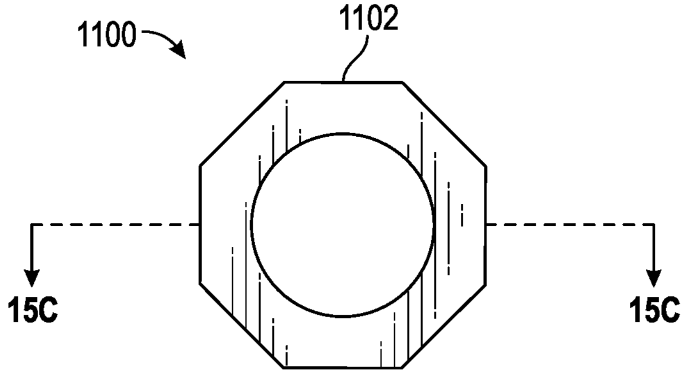
FIGS. 15A-15C illustrate an exemplary SDS connector coupler, where
Figure 15B:
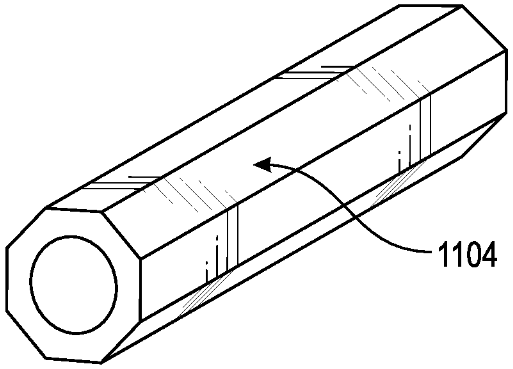
Figure 15C:
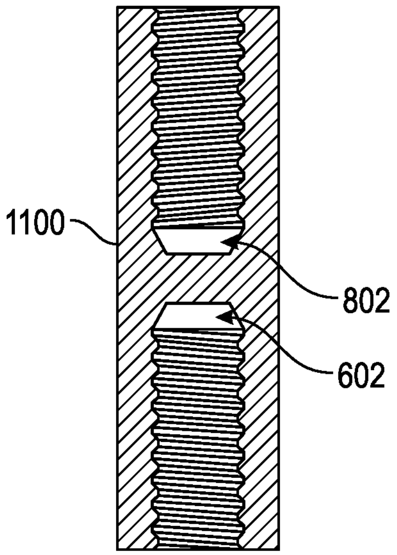

Continuing with FIGS. 15A-15C, both the SDS extension shaft 900 and the angled-end SDS shaft extension shaft 1000 require coupling means to securely attach to distal end 120 of reciprocating ram 116, SDS shaft 408, or various end adapter tools 128, 1900*a-e*. Thus, kit 100 provides an SDS connecter coupler 1100. FIG. 15A shows a top view of SDS connecter coupler 1100 receiving angled male threaded ends 802, 602. The isometric view in FIG. 15B shows SDS connector coupler 1100 is threaded and sized to receive any of the male threaded ends 802, 802, 902*a-b*, 1002*a-b* described above that have the angled machine surface.

The sectioned view in FIG. 15C shows a sectioned view of the SDS connecter coupler 1100 taken along section 11C-11C of FIG. 11A. SDS connecter coupler 1100 serves to couple the various adapters, reciprocating arms, adapter tools, and SDS shafts in linear connectivity. SDS connecter coupler 1100 provides a unique seating couch that transfers force form the hammer mechanism 112, so as to minimize damage to threaded adapter tools or SDS shaft extensions and adapters. The sectioned view shows how the SDS connector coupler 1100 allows for the proper mating and seating between the round end of the shaft and the SDS shaft extensions and end tools.

In one embodiment, SDS connector coupler 1100 receives threaded male end shaft 1102 from SDS shaft tool adapter 800; and threaded male adapter 602 from nail remover chisel tool 1900*d*. Though any of the above-described tools may be coupled through SDS connecter coupler 1400. Additionally, SDS connecter coupler 1100 is defined by a threaded opening 1102 and an octagon shape 1104 for easy tightening or loosening with a crescent wrench. Further, the length of an SDS shaft can be extended by adding multiple SDS connecter couplers.

Figure 16A:
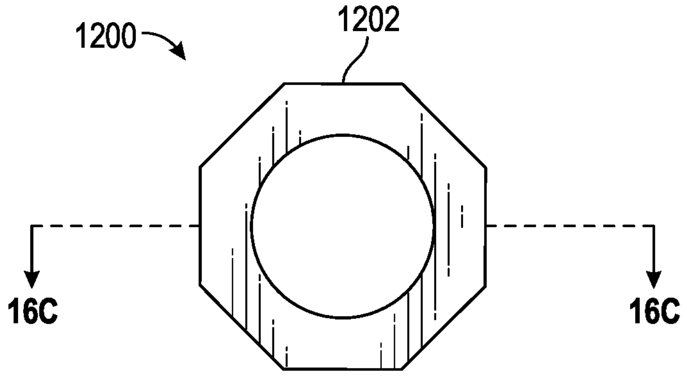
FIGS. 16A-16C illustrate an exemplary SDS connector coupler, where

In yet another coupling means, FIG. 16A shows a top view of an SDS connecter coupler 1200 receiving rounded male threaded ends 602, 612. SDS connecter coupler 1200 serves to couple the various adapters, reciprocating arms, adapter tools, and SDS shafts in linear connectivity. In one embodiment, SDS connector coupler 1200 has a threaded inner surface that is shaped and dimensioned to receive any of the male threaded ends 802, 802, 902*a-b*, 1002*a-b* described above that have the round machine surface. In one embodiment, SDS connector coupler 1200 receives threaded male end shaft 704 from SDS shaft tool adapter 700; and threaded male adapter 602 from angled flat chisel tool 1900*e*. Though any of the above-described tools may be coupled through SDS connecter coupler 1200.

Figure 16B:
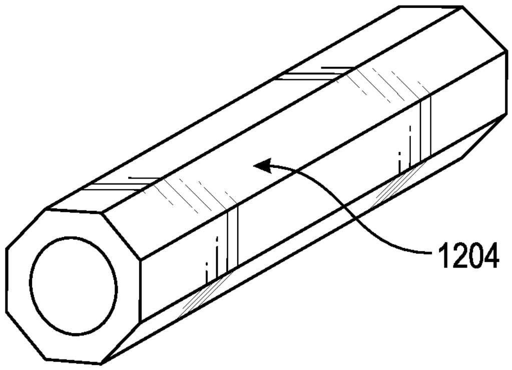
Figure 16C:
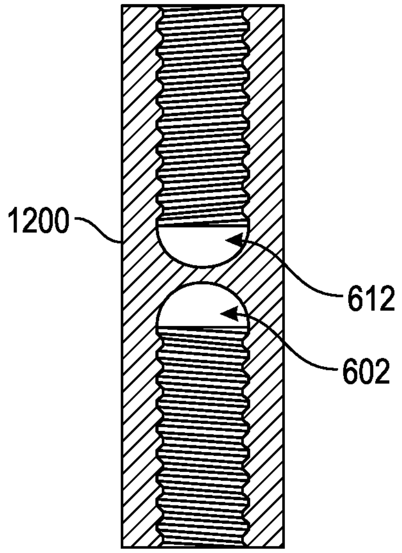

As illustrated in the sectioned view of FIG. 16C taken along section 16C-16C of FIG. 16A. SDS connecter coupler 1200 allows for the proper mating and seating between the round end of the shaft and the SDS shaft extensions and end tools. Furthermore, FIG. 16B illustrates SDS connecter coupler 1200 having a threaded opening and an octagon shape for easy tightening or loosening with a crescent wrench. Further, the length of an SDS shaft can be extended by adding multiple SDS connecter couplers.

Figure 17A:
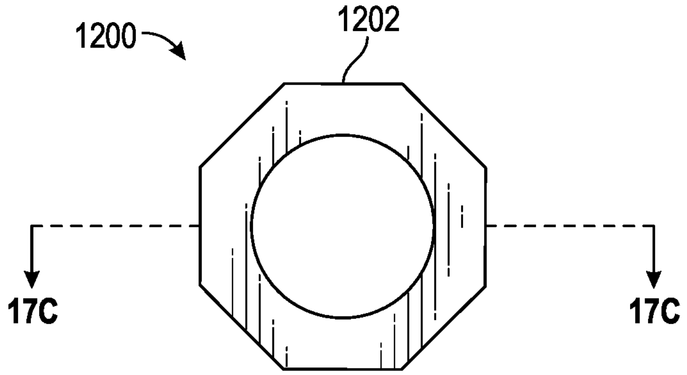
FIGS. 17A-17C illustrate an alternative embodiment of a two-step SDS connector coupler, where
Figure 17B:
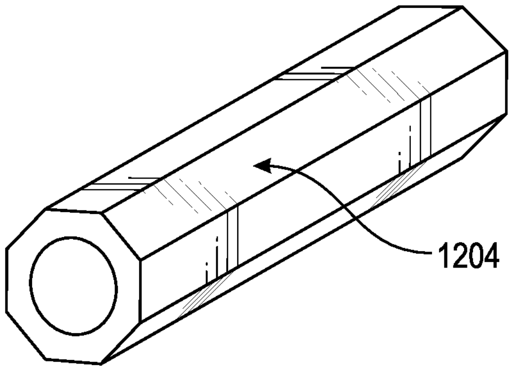
Figure 17C:
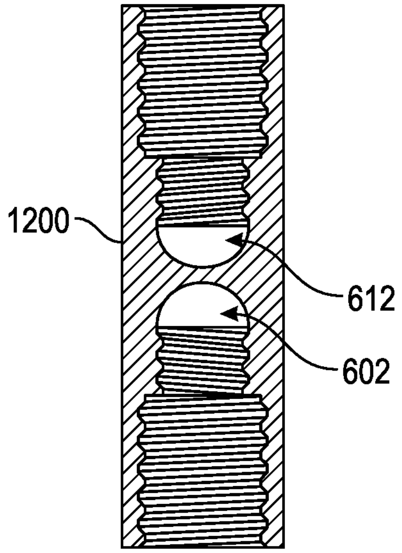

However in some embodiments, a coupling means is not used for detachably attaching tools and extending the SDS shaft. FIG. 17A references an SDS extension shaft 1200 that does not require coupling means. SDS extension shaft 1200 is unique in using a wider threaded female end 1214 to enable entry of a two-step threaded male end 1204, which creates a connectivity means that eliminates need for the coupling or coupler. Two-step threaded male end 1204 includes a threaded wide portion 1208 and a threaded narrow portion 1206 that terminates at an angled flat machine surface 1210 for proper seating with a female couch. A jam nut 1212 is used to tighten a body section 1202 of SDS extension shaft 1200 after being seated in coupling base or tool base. SDS extension shaft 1200 also has a wider threaded female end 1214 receives a two-step threaded male end 1204 that terminates at a round machined surface 1216 (FIG. 17B), or an angled flat machine surface 1218 (FIG. 17C) for proper seating and alignment.

Figure 18A:
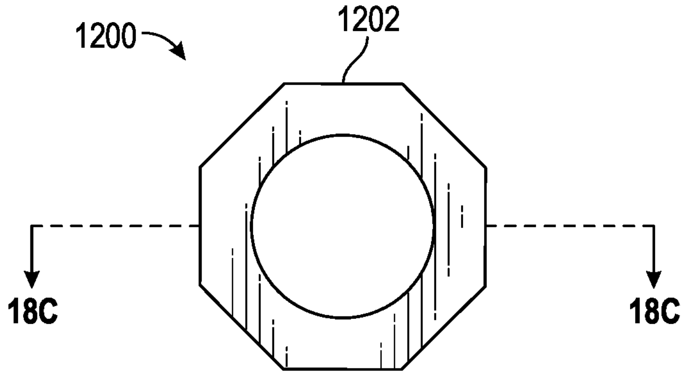
FIGS. 18A-18C illustrate an alternative embodiment of a two-step SDS connector coupler, where
Figure 18B:
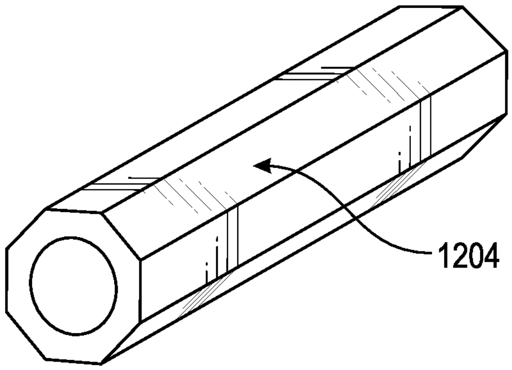
Figure 18C:
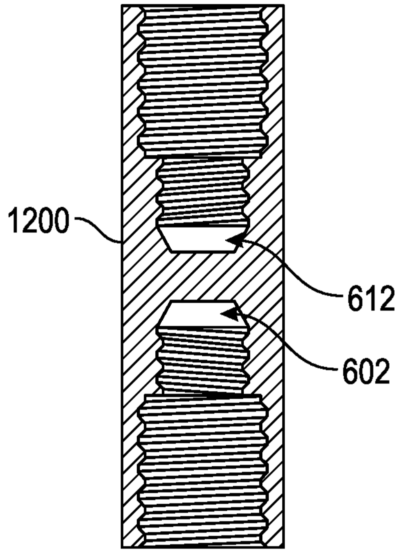

Similarly, FIGS. 18A-18C illustrate an alternative embodiment of a two-step SDS connector coupler, where FIG. 18A shows a top view of the two-step SDS connector coupler. FIG. 18B shows an isometric view of the two-step SDS connector coupler. FIG. 18C shows a sectioned view of the two-step SDS connecter coupler, the section taken along section 18C-18C of FIG. 18B, detailing the connector coupler receiving angled male threaded ends. A jam nut 1212 is used to tighten a body section 1202 of SDS extension shaft 1200 after being seated in coupling base or tool base.

Figure 3:
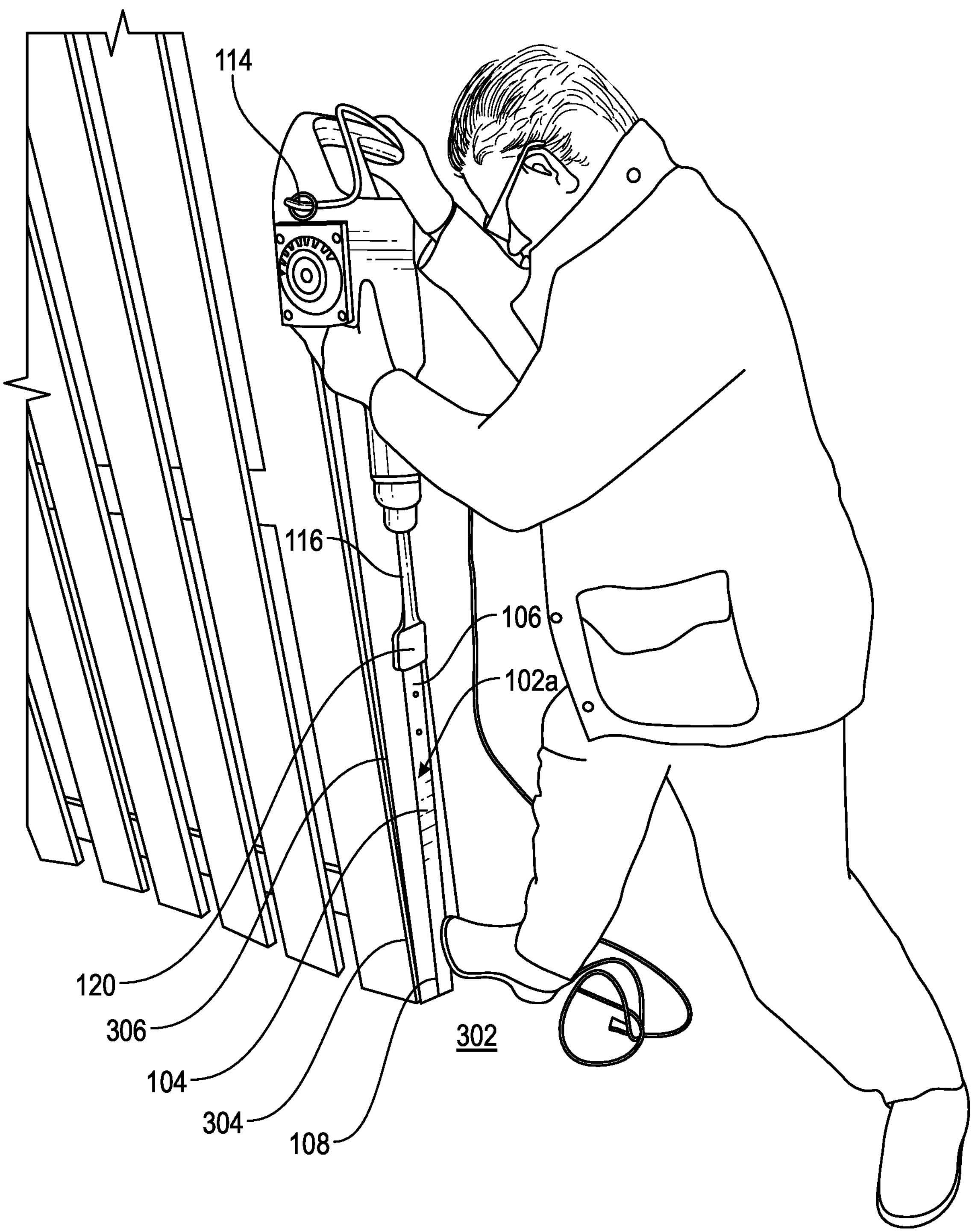
FIG. 3 illustrates a perspective view of the stake aligned with the post in preparation for being driven into the ground surface, in accordance with an embodiment of the present invention.

Looking again at the functionality of stake 102*a-b* in relation to first section 304 and second section 306 of post 300, the kit 100 provides at least one fastener 122*a*, 122*b* that is sized and dimensioned to pass through fastener hole 110*a*, 110*b*, 110*c*, 110*d*, 110*e* for securing stake 102*a* to post 300 (FIG. 3). In one non-limiting embodiment, fastener 122*a* comprises a threaded screw. Though in other embodiments of the present invention, the fasteners may include, without limitation, a bolt, a pin, a nail, a magnet, and a weld. Looking ahead to FIG. 5B, kit 100 provides a fastening mechanism 124 operable to drive the fastener through fastener hole 110*a-e*. In some embodiments, fastening mechanism 124 comprises an electric drill that fits to the terminus of fastener. However in other embodiments, fastening mechanism 124 may be a manual screw driver, a wrench, a hammer, and a drill bit.

Figure 6:
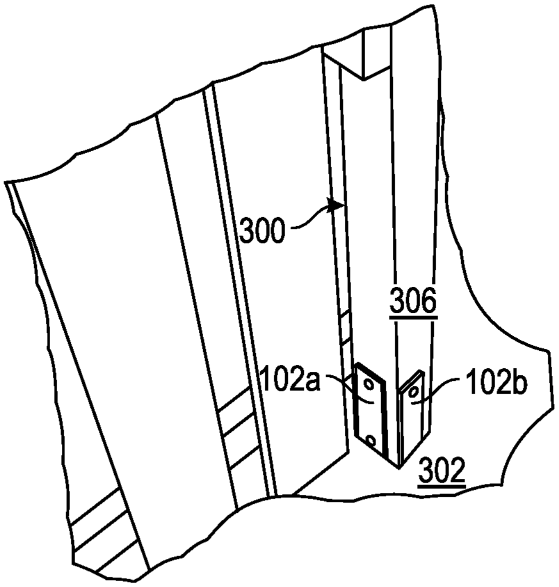
FIG. 6 illustrates a perspective view of the stake fully secured to the repaired post, in accordance with an embodiment of the present invention.
Figure 7:
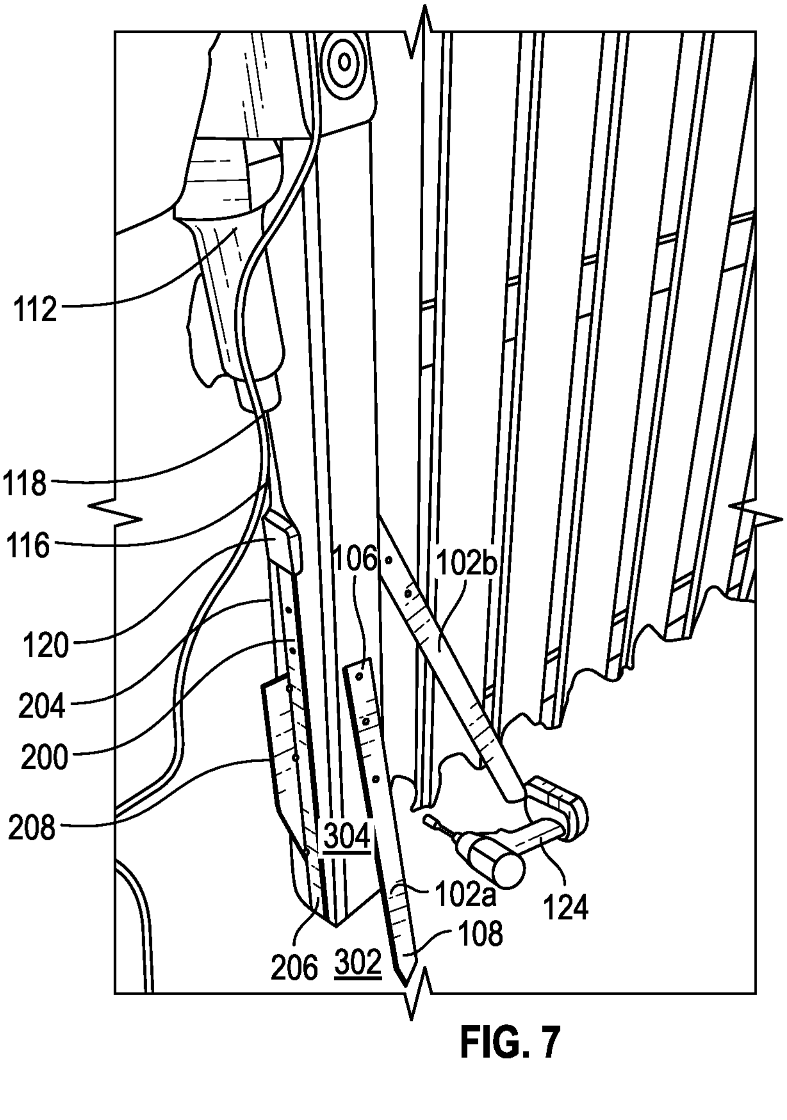
FIG. 7 illustrates a perspective view of the flanged stake fully secured to the repaired post, in accordance with an embodiment of the present invention.

In operation, the body 104 of stake 102*a-b* is operable to align with a first section 304 of the post 300 (FIG. 6). The first section 304 may include a broken section, generally extending from the ground surface 302. Though first section 304 may also be pulled out of the ground surface, requiring repair. A second section 306 of post 300 is aligned, coplanar with the first section 304. Second section 306 is a new section of the post 300 that is configured to repair the broken post, i.e., first section. Body 104 of the stake 102*a-b* forms a junction between the first section 304 of the post, and the second section 306 of the post.

In essence, the stake 102*a-b* braces the first and second sections of post. Stake 102*a-b* is also fastened to the side of the first and second sections of the post. Hammer mechanism 112 couples to proximal end of the stake 102*a-b* and drives stake 102*a-b* into the ground surface (FIG. 3). Once driven into the ground on opposite sides of the post, stake 102*a-b* stabilizes the lateral orientation of the broken pole. This eliminates the need to remove the pole from the ground 302, as the upper broken off section of the pole can simply be positioned over the lower end of the pole that is still in the ground surface 302.

Then the stake 102*a-b* can be driven into place by hammer mechanism 112 to hold together first and sections 304, 306 of the post. However, the kit 100 provides an additional means to secure stake 102*a* flush against post 300. FIG. 16 illustrates fastening mechanism 124 drilling a first of the fasteners 122*a* into fastener hole 110*e*. Next, a second fastener 122*b* is drilled into fastener hole 110*d*. At this point, stake 102*a-b* is both, penetrated into the ground surface 302, and securely fastened against the first and section 304, 306 of post 400. Stake 102*a-b* is fastened to sides of post 400 to create a secure brace there against (FIG. 4). As discussed above, a flanged stake 200 is also useful for repairing the post, while also providing an extending flange to support an adjacent post (FIG. 6).

Figure 20:
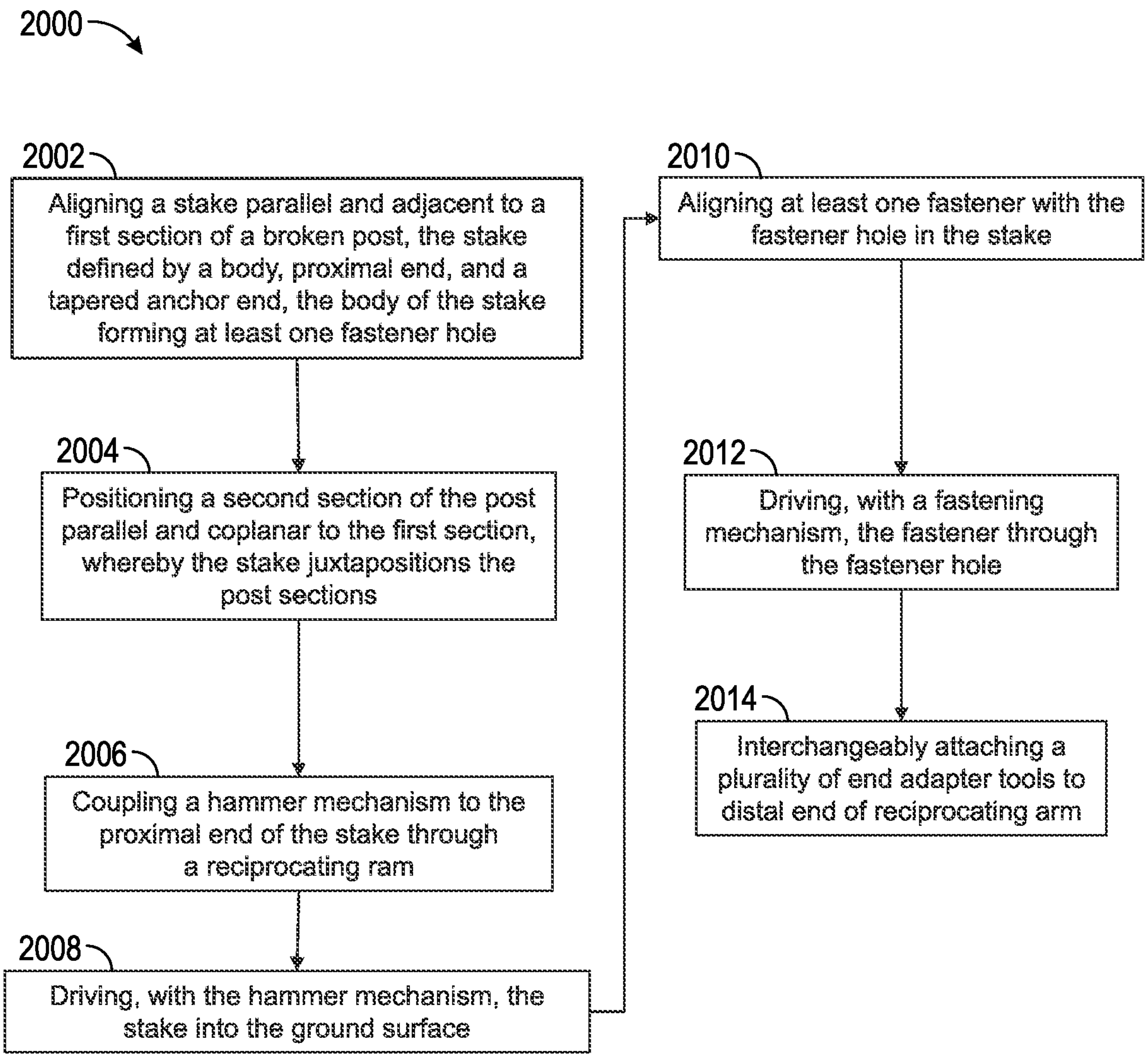
FIG. 20 illustrates a flowchart of an exemplary method of repairing a post, in accordance with an embodiment of the present invention.

FIG. 20 illustrates a flowchart of an exemplary method 2000 of repairing a post. Method 2000 may include an initial Step 1902 of aligning a stake parallel and adjacent to a first section of a broken post, the stake defined by a body, proximal end, and a tapered anchor end, the body of the stake forming at least one fastener hole. A Step 1904 comprises positioning a second section of the post parallel and coplanar to the first section, whereby the stake juxtapositions the post sections. A Step 1906 includes coupling a hammer mechanism to the proximal end of the stake.

In some embodiments, a Step 1908 comprises driving, with the hammer mechanism, the stake into the ground surface. A Step 1910 includes aligning at least one fastener with the fastener hole in the stake. In some embodiments, a Step 1912 may include driving, with a fastening mechanism, the fastener through the fastener hole. This works to reinforce the connection between the first and second sections of the post.

A final Step 1914 includes interchangeably attaching a plurality of end adapter tools to distal end of reciprocating arm. The tools may have various functions pertinent to repairing a post. In some embodiments, an end adapter tool 128 has a slot for receiving, and mating with the proximal end of the stake for operation thereof. Additional end adapter tools 1900*a-e* may include, without limitation, a chisel point tool 900*a*, a narrow flat chisel tool 900*b*, a wide flat chisel tool 900*c*, a nail remover chisel tool 900*d*, and an angled flat chisel tool 900*e*.

In conclusion, the kit 100 and method 2000 of reparation is designed to juxtaposition a lateral brace to a broken section and a new section of a fence post. The kit provides a stake defining a proximal end that couples to a hammer mechanism having a reciprocating ram, and a tapered anchor end that drives into the ground. Interchangeable end adapter tools detachably attach to distal end of reciprocating ram. The stake is aligned parallel to the broken section of the post, and the new section of the post, serving as a junction therebetween. The hammer mechanism drives the stake into the ground parallel and adjacent to the sections of the fence post. Fasteners are driven into fastener holes in the stake to secure the stake against the post sections. So as to provide lateral support to the mended junction.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figure 21B:
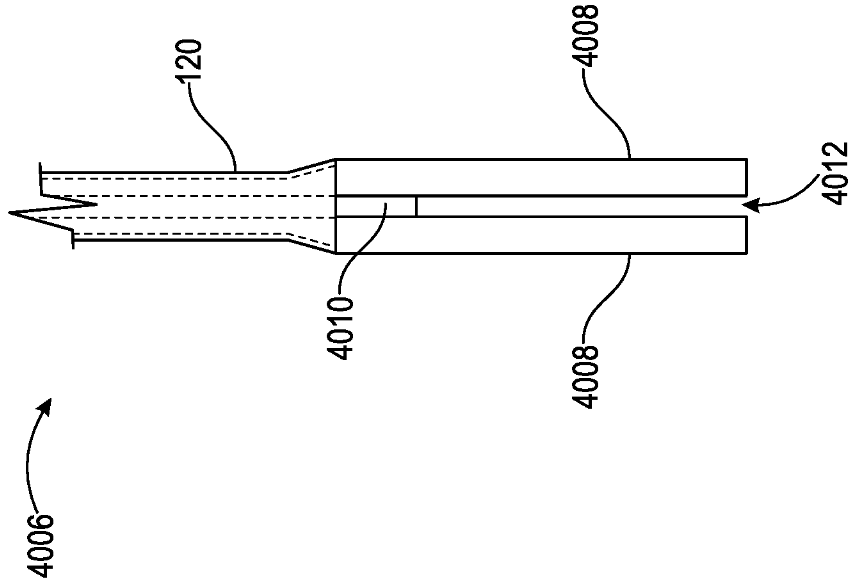
FIG. 21A shows a side perspective view of the open sided end adapter tool and stake and FIG. 21B shows a cross-sectional view of the open sided end adapter tool in accordance with the present disclosure.
Figure 21A:
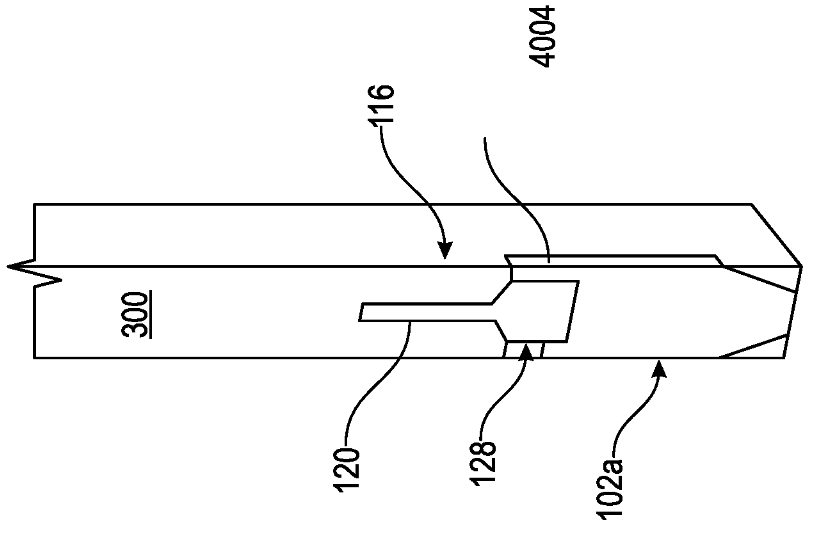

FIGS. 21A and 21B shows an embodiment of the present disclosure that includes an open sided end adapter tool 4006. Open sided end adapter tool 4006 is one embodiment of end adapter tools 128 adapted to be applied to the proximal end of stake 102 regardless of the width of stake 102. As shown in FIG. 21B, open sided end adapter tool 4006 has a generally rectangular acceptor slot 4012 formed between plates 4008. The rectangular slot may, in one embodiment, be open on three sides and closed only at the top portion where driver strip 4010 contacts the proximal end of stake 102. As shown in FIG. 21A, this embodiment allows for a stake 102 having a width at its proximal end greater than the width of acceptor slot 4012 to be accommodated by open sided end adapter tool 4006. Additionally, this embodiment allows for an end adapter tool to be compatible with a stake 102 having a bend or flange along an edge of the stake 102. With this embodiment, a stake 102 of any width may be compatible with an end adapter tool according to the present disclosure. Additionally, as shown in FIG. 21A, open sided end adapter tool may accommodate a stake 102 having stake wings 4004. Stake wings 4004 may be formed by forming a right-angle bend in stake 102, thereby forming U-shaped anchor stake 4002, to at least partially wrap around post 300.

Figure 22:
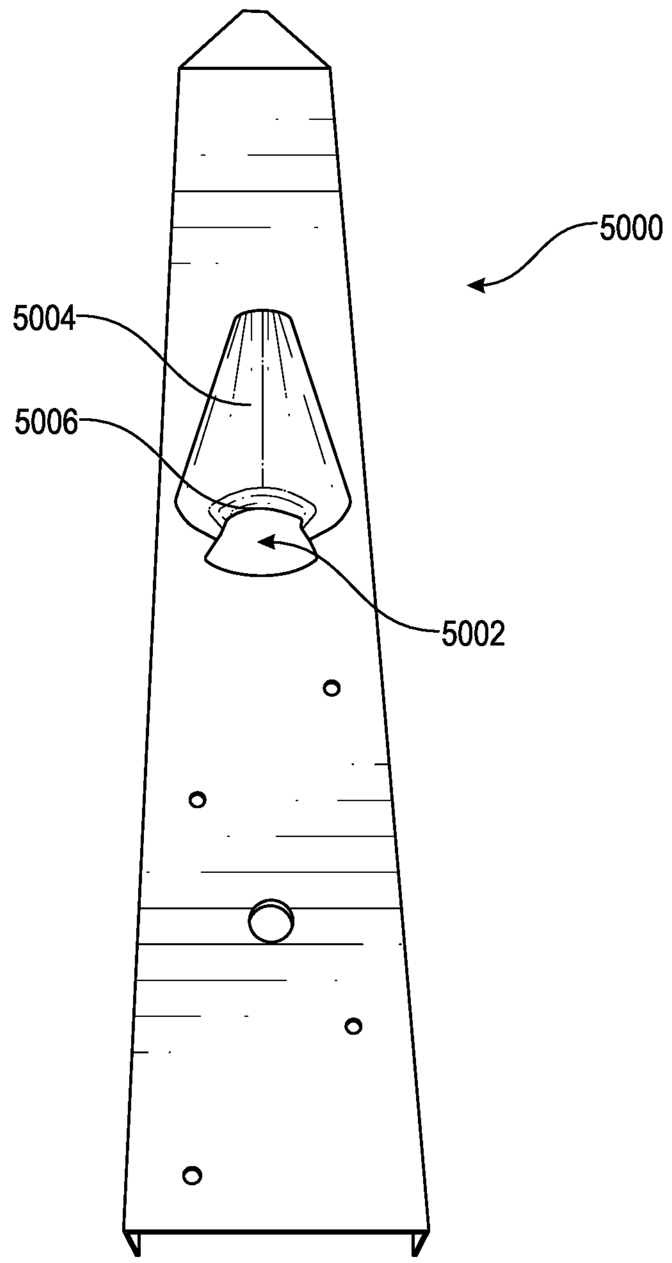
FIG. 22 shows a top perspective view of one embodiment of the present disclosure including a gapped anchor stake according to the present disclosure.

FIG. 22 shows one embodiment of the present disclosure wherein a gapped anchor stake 5000 may be used as an embodiment of stake 102. Gapped anchor stake 5000 includes a ram acceptor 5004, which may be located on an outer surface of gapped anchor stake 5000. Ram acceptor may be at least partially conical in shape, such that ram acceptor 5004 has a decrease in diameter toward the distal end of stake 102. Ram acceptor 5004 may protrude from the outer surface of stake 102, which allow for ram acceptor 5004 to include a ram aperture 5002 at an upper end of ram acceptor 5004, in a direction toward the proximal end of stake 102. Ram aperture may be generally horizontal to the plane formed by stake 102, and ram acceptor rim 5006 may also be, at least in part, horizontal to the plane formed be stake 102.

Figure 23:
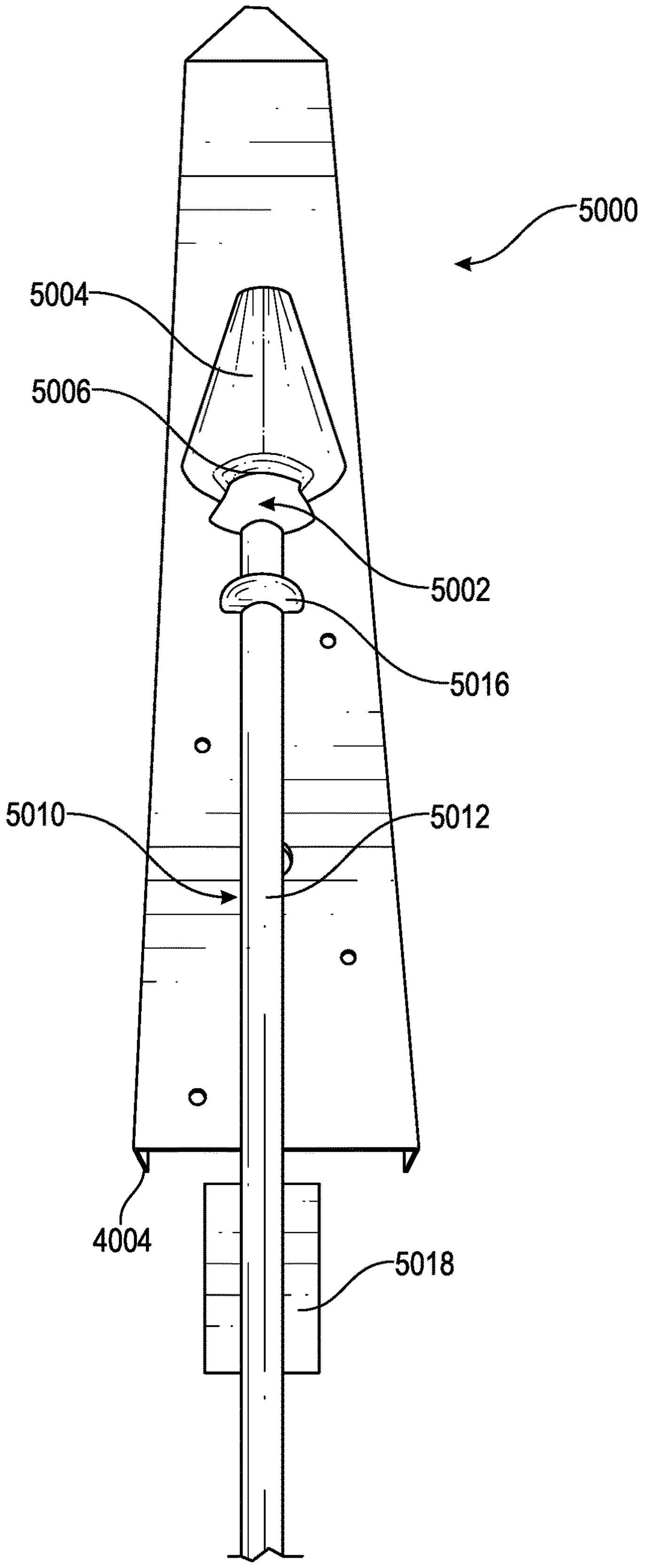
FIG. 23 shows a side perspective view of one embodiment of the present disclosure including a gapped anchor stake with a flange tipped ram being inserted according to the present disclosure.
Figure 25B:
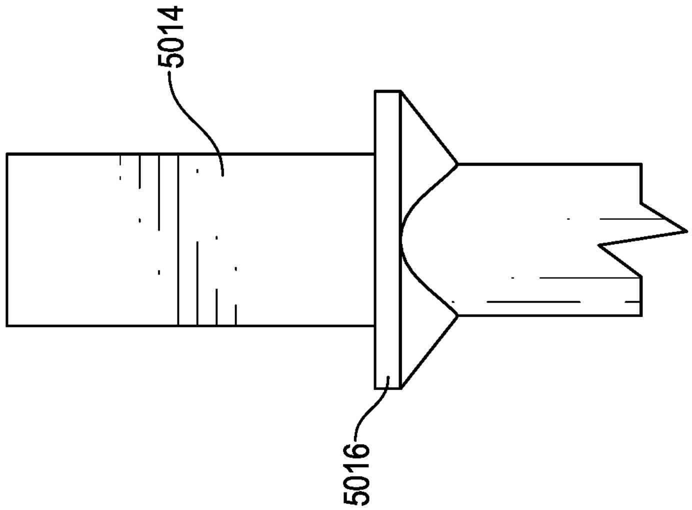
FIG. 25A shows a side view of a ram grip on the flange tipped ram according to the present disclosure and FIG. 25B shows a side view of the ram end flange according to the present disclosure.

FIG. 23 shows front perspective view a U-shaped anchor stake 4002, which in one embodiment is also a gapped acceptor stake 5000, wherein a flange tipped ram 5010 is being inserted into ram aperture 5002 of ram acceptor 5004. Ram end flange 5016 contacts ram acceptor 5004 after the distal end of ram flange-tipped ram 5010. Male connector 5014, as shown in FIG. 25B, may be inserted into ram aperture 5002 of ram acceptor 5004. Flange tipped ram 5010 may have a flange tipped ram proximal end 118 that joins to power portion 114 of hammer mechanism 112, as disclosed herein previously with regard to alternative end adapter tools 128.

Further, FIG. 23 shows a ram grip 5018, which is located on an inner portion of flange tipped ram 5010 at a proximal end. Ram grip may be, in one embodiment, comprised of a plate connected and spaced apart from the proximal end of flange tipped ram 5010.

Figure 24:
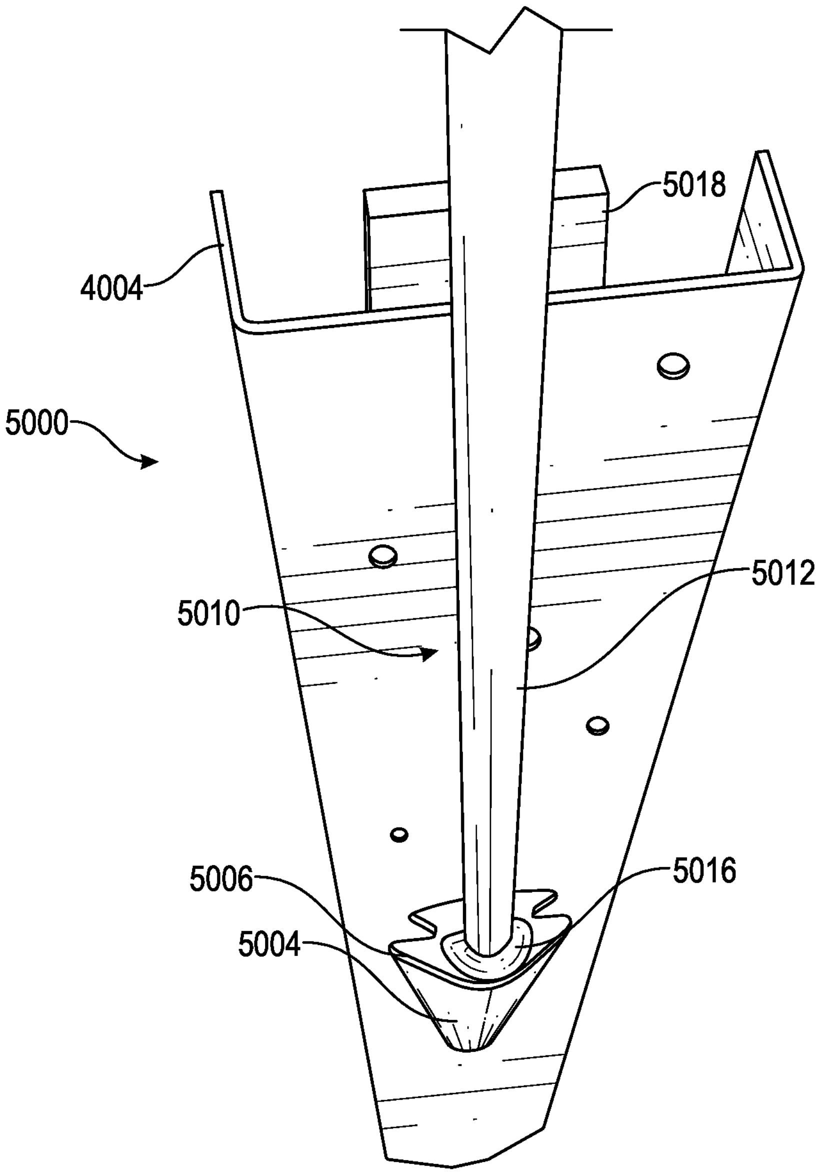
FIG. 24 shows a top perspective view of one embodiment of the present disclosure including a gapped anchor stake with a flange tipped ram inserted according to the present disclosure.
Figure 25A:
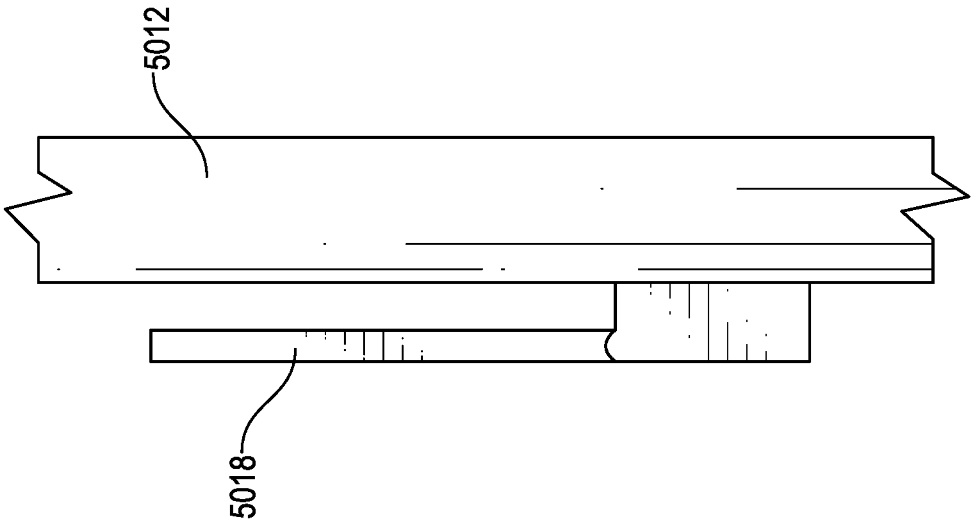

FIG. 24 shows how ram grip 5018 allows for the proximal end of gapped acceptor stake 5000 to slide between the plate of ram grip 5018 and the rod portion of proximal end of flange tipped ram 5010. Ram grip 5018 is spaced apart from ram end flange 5016 such that when ram end flange 5016 is in contact with ram acceptor rim 5006, the proximal end of gapped acceptor stake is secured in place within ram grip 5018. FIGS. 25A and 25B show magnified side views of ram grip 5018, male connector 5014 and ram end flange 5016, respectively.

Figure 26B:
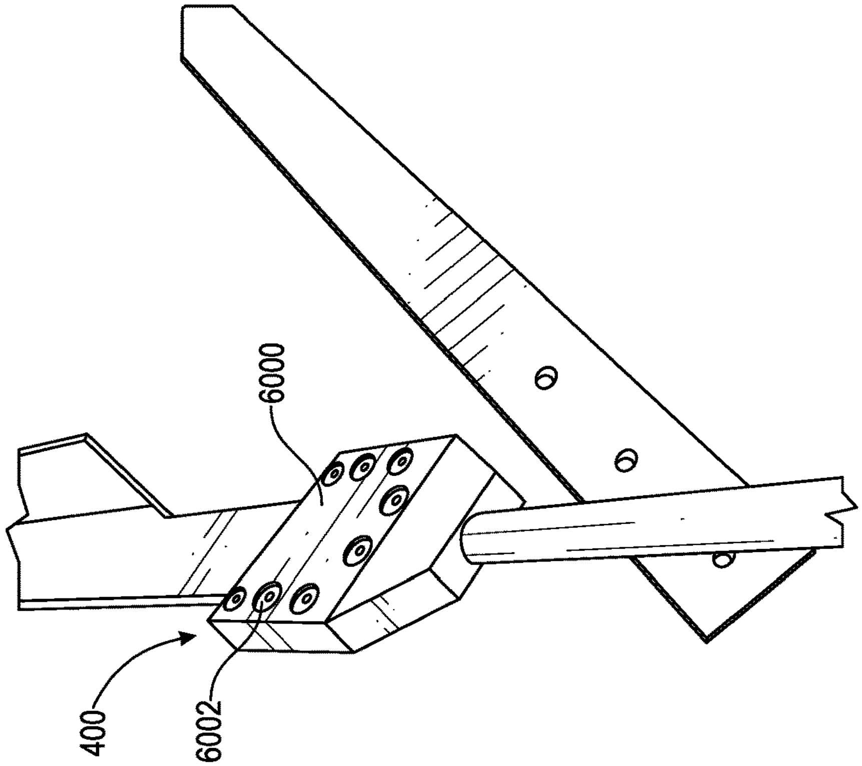
FIG. 26A shows a side perspective view of the open sided end adapter tool assembled with screws and FIG. 26B shows a top perspective view of the end adapter tool having closed sides and a flat shape assembled with screws according to the present disclosure.
Figure 26A:
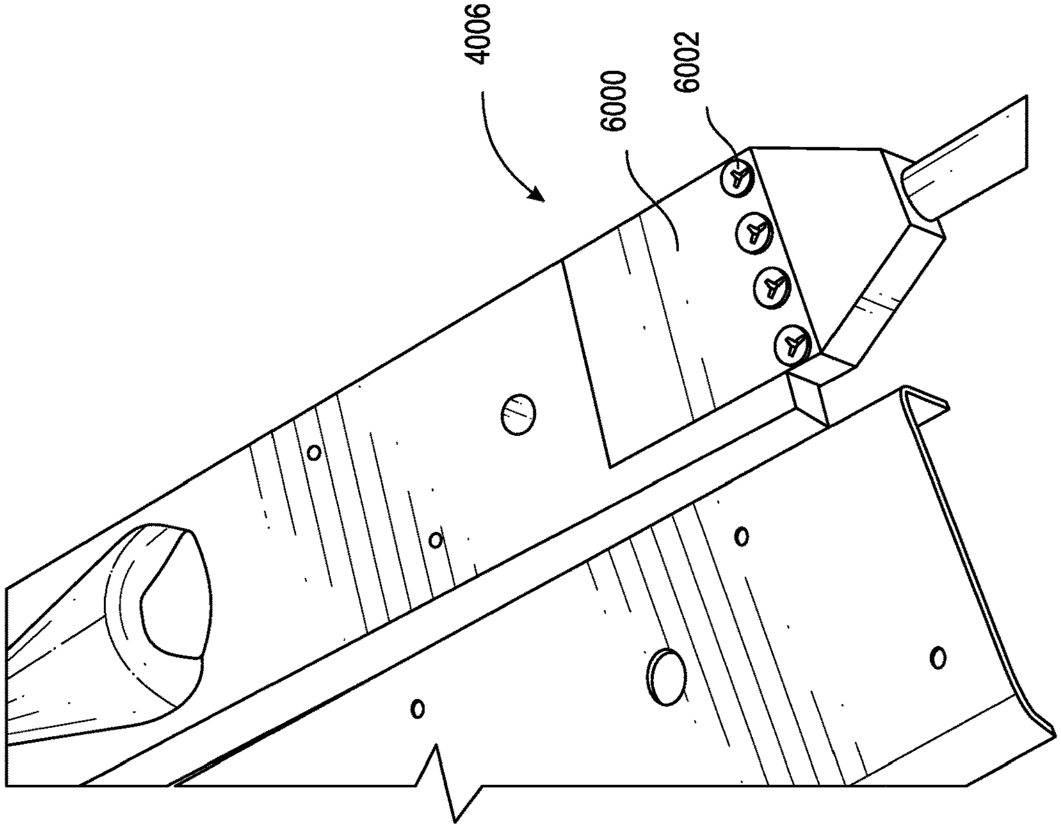

FIGS. 26A and 26B show embodiments of end adapter tools 400 and 4006 having novel means of assembly. With regard to FIG. 26A, open sided end adapter tool 4006 is assembled from a cover plate, which is fastened to the rest of the end adapter tool with screws 6002, as would be known to one of ordinary skill in the art. Screws may be placed into precast grooves for accepting the screws, and the plate 6000 is thereby separated from the opposite side of end adapter tool 400, thereby allowing for the presence of a slot 132 for accepting the proximal end of stake 102. With regard to FIG. 26B, end adapter tool 400 includes a cover plate 6000 which may be placed with screws 6002 to form a slot 132 that is closed on all sides except for the opening for accepting the proximal end of stake 102.

Figure 27:
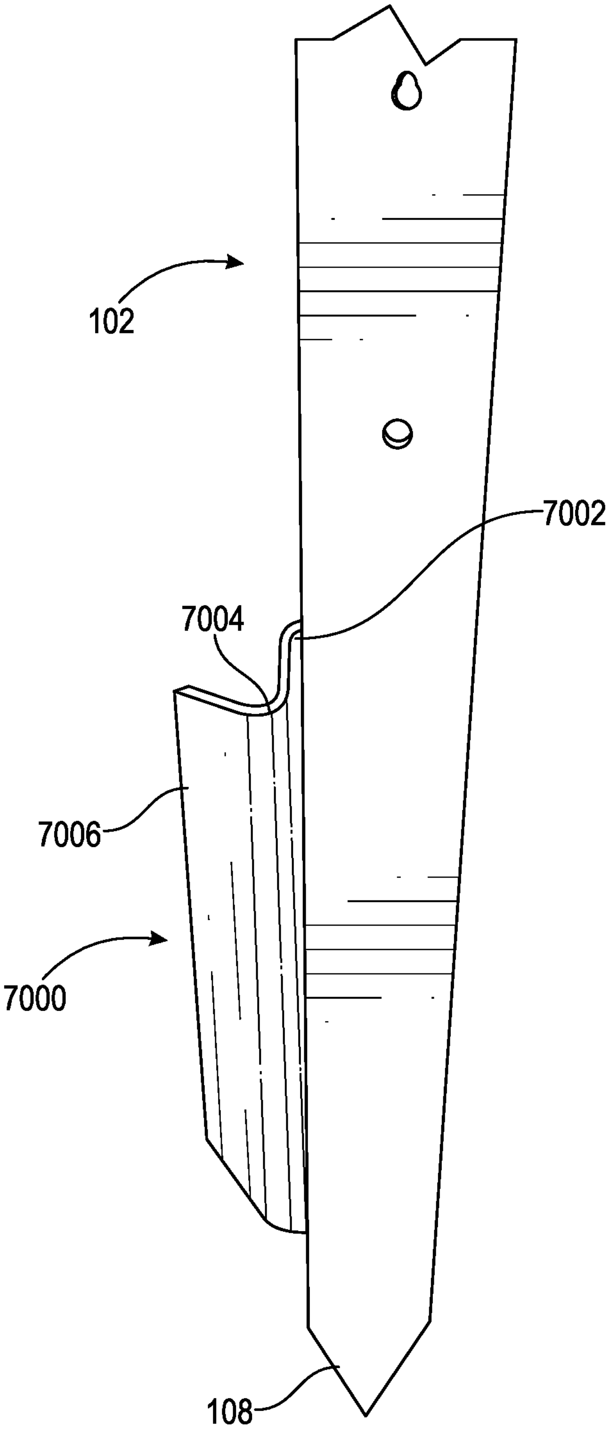
FIG. 27 shows a top perspective view of a stake stabilizer according to the present disclosure.
Figure 28:
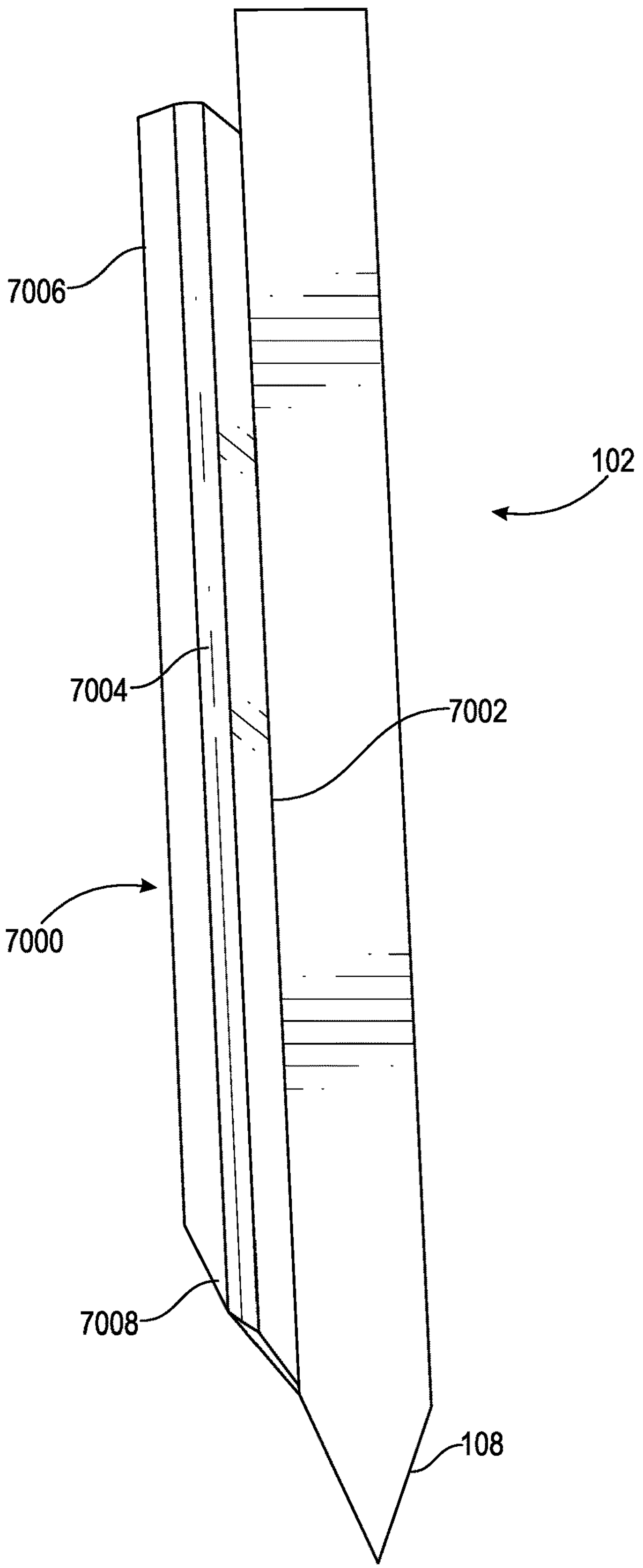
FIG. 28 shows a side perspective view of a stake stabilizer according to the present disclosure.

FIGS. 27 and 28 show a top front perspective view and a front perspective view, respectively, of one embodiment of stake 102, including a stake stabilizer 7000. In this embodiment, stake 102 is stabilized by stake stabilizer 7000, wherein stake stabilizer 7000 is formed integrally with stake 102 and includes a right-angle bend 7002 and obtuse curved break 7004. Obtuse curved break 7004 may, in one embodiment, extend away from the shaft of stake 102. Stake stabilizer 7000 may extend along a central portion of stake 102 and terminate prior to the distal or proximal end of stake 102. In some embodiments, stake stabilizer 7000 may have a single bend, while in other embodiments, stake stabilizer 7000 may have at least two bends, as shown in FIG. 27.

Figure 29:
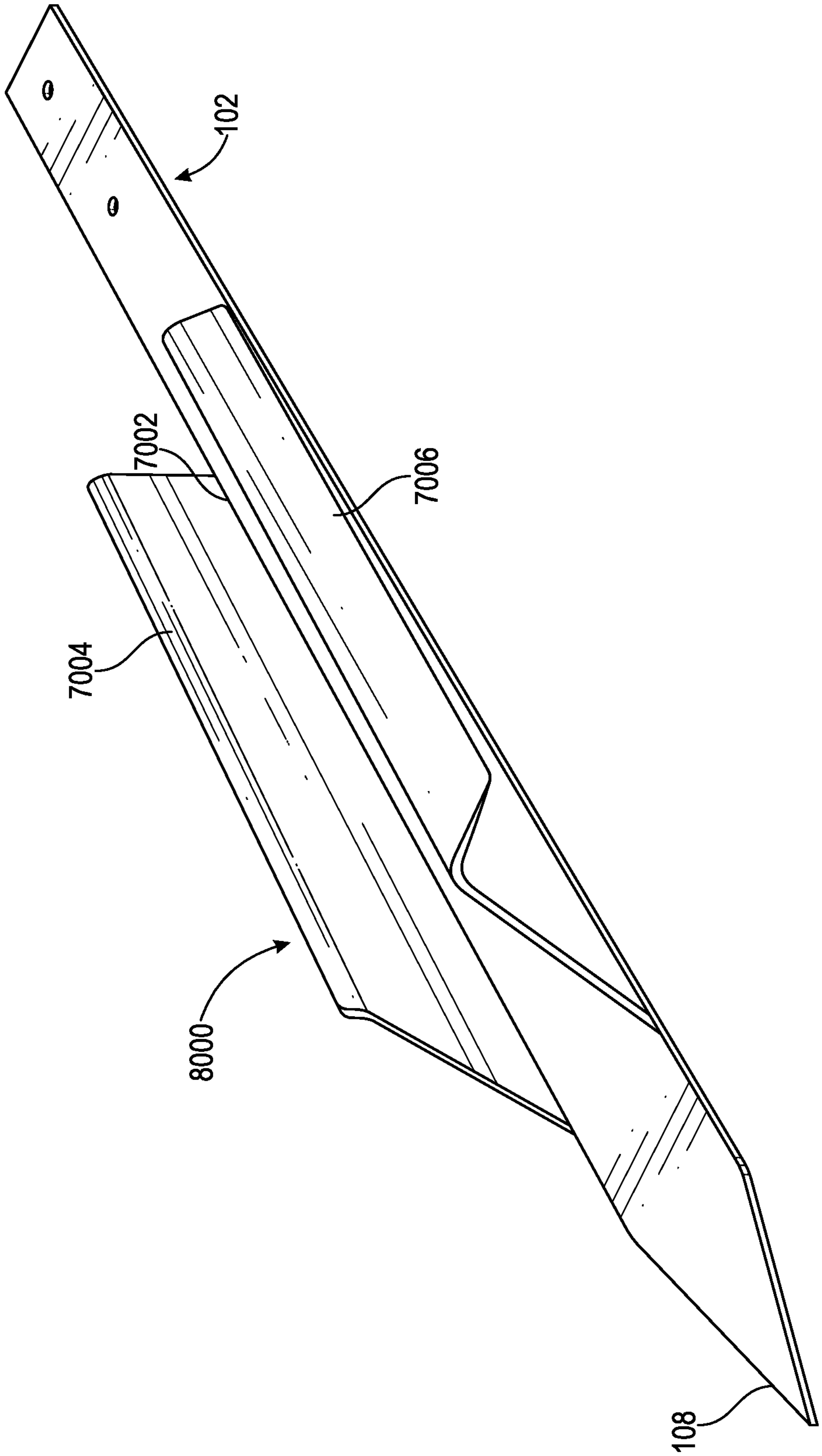
FIG. 29 shows a side perspective view of a stake having multiple stake stabilizers according to the present disclosure.

With regard to FIG. 29, in some embodiments, stake 102 may have two stake stabilizers 7000, one on each side of stake 102, and on the same side of stake 102. In other embodiments, stake 102 may have three or four stake stabilizers 7000, such that the stake stabilizers 7004 may be formed with two on each side of stake 102, on opposite faces of stake 102, such that a mirror image is formed, with respect to the stake stabilizer 7000 shown in FIG. 29.

Figure 30:
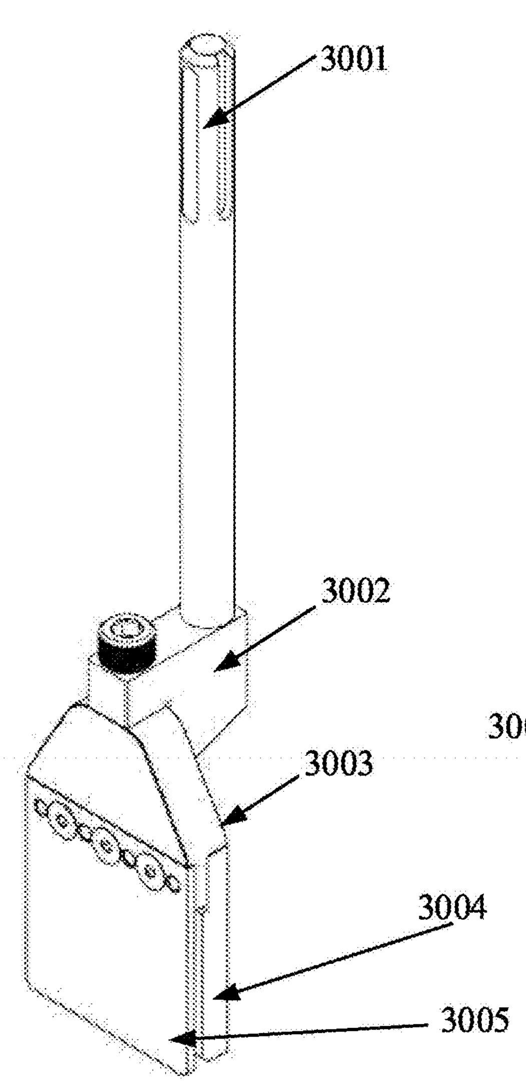
FIG. 30 shows a side perspective view of a reciprocating ram structure, in accordance with one embodiment of the present disclosure.

FIG. 30 shows a side perspective view of a reciprocating ram structure, in accordance with one embodiment of the present disclosure. The reciprocating ram structure disclosed herein is utilized for repairing a damaged post of a fence or a boundary. The reciprocating ram structure is used on conjunction with a stake and a hammer mechanism. The stake is used to provide support to the damaged post by depressing the stake along the length of the damaged post into the ground. The stake is defined by a body, proximal end, and a tapered anchor end. The body of the stake comprises at least one hole at the proximal end of the stake. The stake is defined by one of a flat rectangular structure, a C-shaped tubular structure, or a U shaped structure that provides additional support to the damaged post. Further, at least one screw is drilled in the damaged post to be repaired through the at least one hole at the proximal end of the stake. The tapered anchor end of the stake is inserted into the ground with the help of the hammer mechanism coupled with the reciprocating ram structure. The hammer mechanism comprises a power portion and the reciprocating ram structure. The power portion forcibly drives the reciprocating ram structure in a reciprocating motion in to the ground.

Figure 36A:
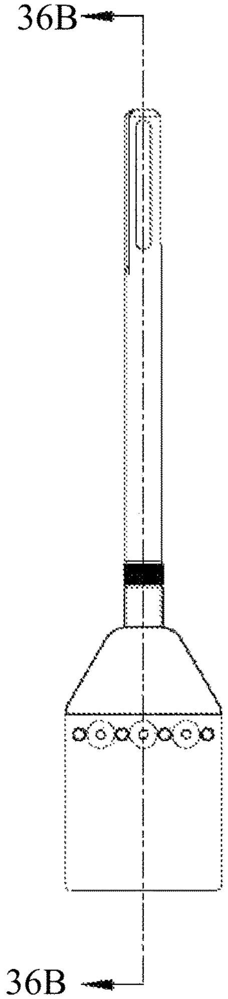
FIG. 36A shows a back view of the reciprocating ram structure and FIG. 36B shows a sectional side view of the reciprocating ram structure taken generally along line 36B-36B in FIG. 36A, in accordance with one embodiment of the present disclosure.
Figure 36B:
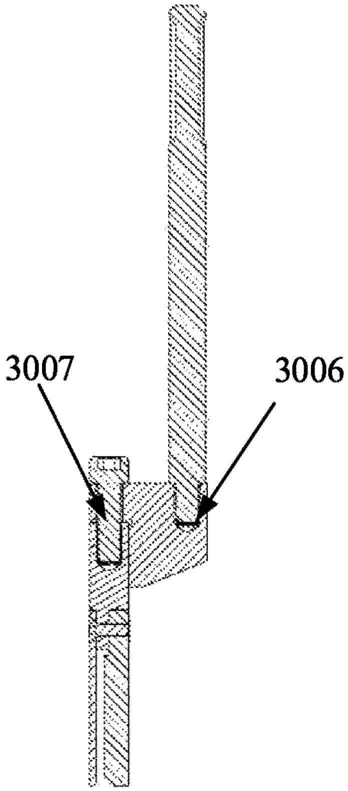

In an embodiment, the reciprocating ram structure comprises a rod structure 3001 having a proximal end coupled with the power portion of the hammer mechanism. The reciprocating ram structure further comprises an offset member 3002 connected to a distal end of the rod structure 3001. In an embodiment, the offset member 3002 has a first hole 3006 and a second hole 3007. In an embodiment, the distal end of the rod structure 3001 is connected to the first hole 3006 as shown in FIG. 36B. Further, the offset member 3002 and the rod structure 3001 are connected perpendicular to each other.

The offset member 3002 having a first region and a second region and the height of the first region is greater than the second region. In an embodiment, the first region corresponds to a region below the first hole 3006 and the second region corresponds to a region below the second hole 3007. The interchangeable adaptor end tool 3003 is supported by the first region of the offset member 3002. In an embodiment, the interchangeable adaptor end tool detachably is connected to the offset member 3002 using a fastening mechanism at the second hole 3007.

In one embodiment, the interchangeable adaptor end tool 3003 comprises a first plate 3004 and a second plate 3005 separated by a pre-defined gap. The proximal end of the stake is inserted in the pre-defined gap. In an embodiment, at least one distal edges of each of the first plate 3004 and the second plate 3005 have a slanted structure and the distal edges of each of the first plate 3004 and the second plate 3005 are not connected to each other.

In another embodiment, the interchangeable adaptor end tool 3003 comprises a first plate 3004 and a second plate 3005. In an embodiment, the distal edge of the first plate 3004 has protrusions of pre-defined width at each corner of the distal edge. The protrusions are in contact with the second plate 3005 thereby forming a rectangular gap between the first plate 3004, the second plate 3005 and the protrusions. Further, the proximal end of the stake is inserted in the rectangular gap. In an embodiment, the first plate 3004 and the second plate 3005 are generally rectangular.

In yet another embodiment, the interchangeable adaptor end tool 3003 comprises a first plate 3004 and a second plate 3005. The distal edge of the first plate 3004 has protrusions of pre-defined width at each corner of the distal edge and another protrusion of a pre-defined width at a center portion of the first plate 3004. The protrusions at each corner of the distal edge have a width greater than the protrusion at the center portion of the first plate 3004. The protrusions at each corner of the distal edge form a gap between the first plate 3004 and the second plate 3005 Further, the first plate 3004 has an E shaped structure when looked from a bottom side of the first plate 3004. Further, the proximal end of the stake is inserted in the gap.

In an embodiment, the gap created between the first plate 3004 and the second plate 3005 is being sized and dimensioned to detachably couple to the proximal end of the stake. The gap has a depth minimally greater than a depth of the stake, such that the interchangeable adaptor end tool 3003 can be placed over the stake.

Figure 31:
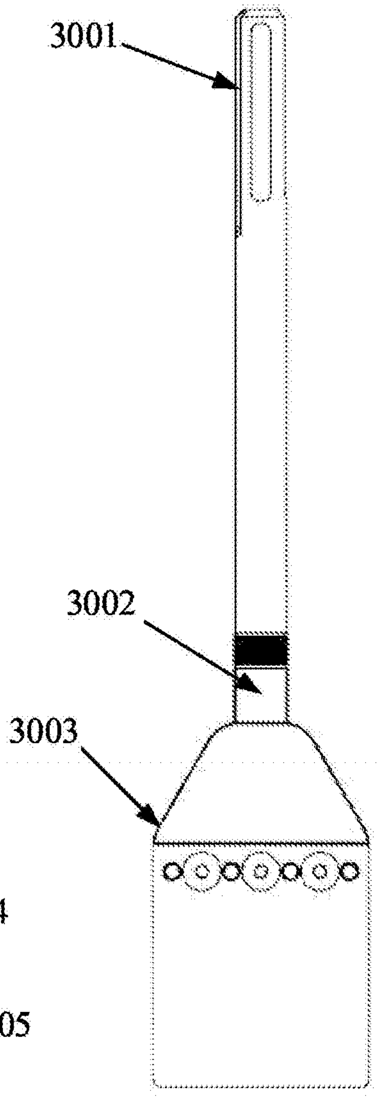
FIG. 31 shows a front view of the reciprocating ram structure, in accordance with one embodiment of the present disclosure.

FIG. 31 shows a front view of the reciprocating ram structure, in accordance with one embodiment of the present disclosure. The reciprocating ram structure comprises a rod structure 3001 having a proximal end coupled with the power portion of the hammer mechanism. The reciprocating ram structure further comprises an offset member 3002 connected to a distal end of the rod structure 3001. In an embodiment, the offset member 3002 has a first hole 3006 and a second hole 3007. In an embodiment, the distal end of the rod structure 3001 is connected to the first hole 3006 as shown in FIG. 36B. Further, the offset member 3002 and the rod structure 3001 are connected perpendicular to each other.

Figure 32:
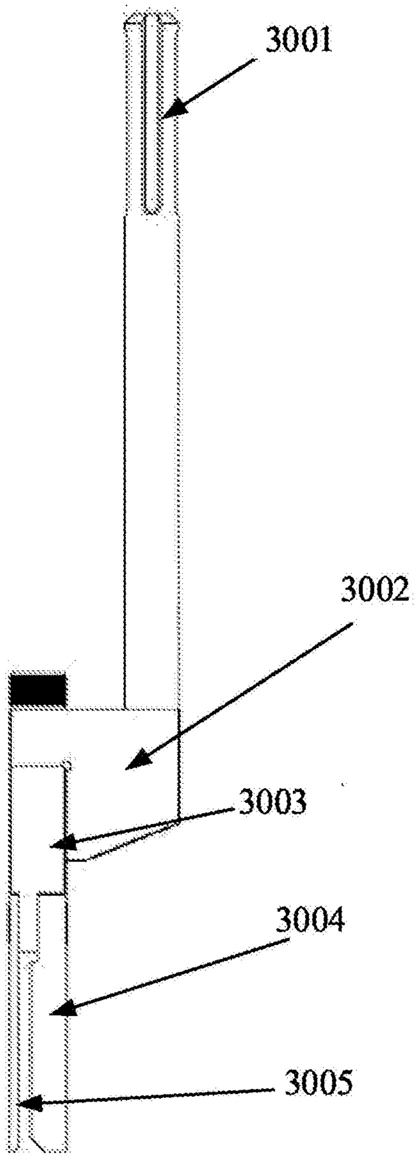
FIG. 32 shows a side view of the reciprocating ram structure, in accordance with one embodiment of the present disclosure.

The offset member 3002 having a first region and a second region and the height of the first region is greater than the second region. In an embodiment, the first region corresponds to a region below the first hole 3006 and the second region corresponds to a region below the second hole 3007. The interchangeable adaptor end tool 3003 is supported by the first region of the offset member 3002. FIG. 32 shows a side view of the reciprocating ram structure, in accordance with one embodiment of the present disclosure. It is illustrated in FIG. 32 that the interchangeable adaptor end tool 3003 is supported by the first region of the offset member 3002.

Figure 33:
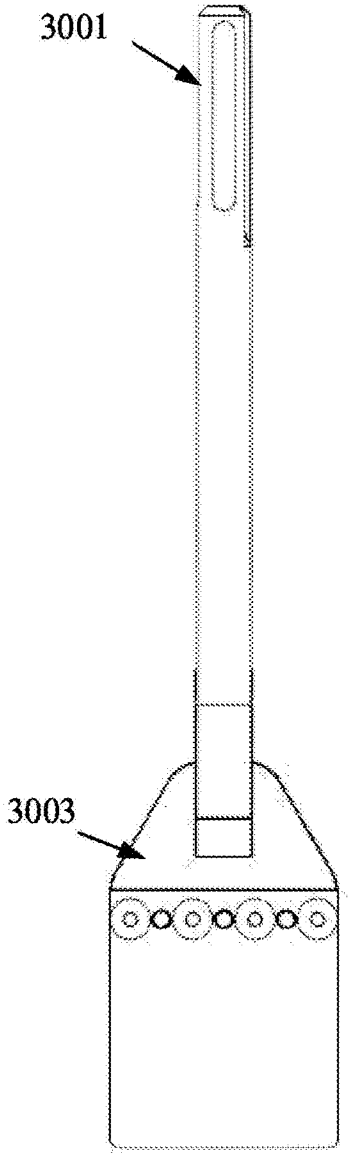
FIG. 33 shows a back view of the reciprocating ram structure, in accordance with one embodiment of the present disclosure.

In an embodiment, the interchangeable adaptor end tool detachably is connected to the offset member 3002 using a fastening mechanism at the second hole 3007 as shown in FIG. 32. FIG. 33 shows a back view of the reciprocating ram structure, in accordance with one embodiment of the present disclosure. In the back view an outer side of the first plate can be viewed.

Figure 34:
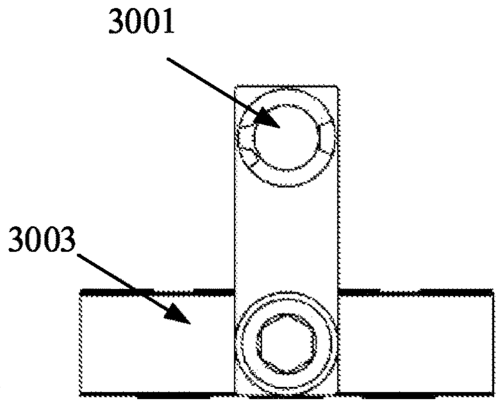
FIG. 34 shows a top view of the reciprocating ram structure, in accordance with one embodiment of the present disclosure.

FIG. 34 shows a top view of the reciprocating ram structure, in accordance with one embodiment of the present disclosure. The rod structure 3001, the offset member 3003 and the fastening mechanism for attaching the interchangeable adaptor end tool is shown in the top view of the reciprocating ram structure. In the first hole 3006 of the offset member 3003, the rod structure 3001 is inserted and in the second hole 3007 the interchangeable adaptor end tool is fixed using the fastening mechanism.

Figure 35:
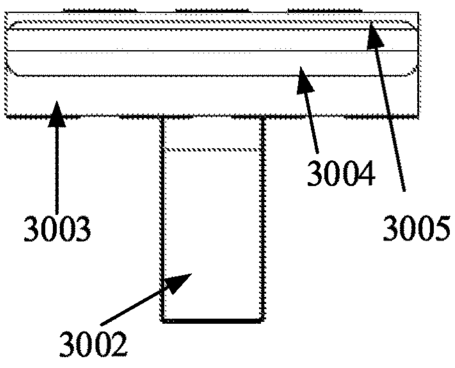
FIG. 35 shows a bottom view of the reciprocating ram structure, in accordance with one embodiment of the present disclosure.

FIG. 35 shows a bottom view of the reciprocating ram structure, in accordance with one embodiment of the present disclosure. The bottom view shows the offset member 3002 and the interchangeable adaptor end tool 3003. The bottom view of the interchangeable adaptor end tool 3003 shows a first plate 3004 and a second plate 3005 separated by a pre-defined gap. The proximal end of the stake is inserted in the pre-defined gap. In an embodiment, at least one distal edges of each of the first plate 3004 and the second plate 3005 have a slanted structure and the distal edges of each of the first plate 3004 and the second plate 3005 are not connected to each other.

FIG. 36B shows a sectional side view of the reciprocating ram structure, in accordance with one embodiment of the present disclosure. In the first hole 3006 of the offset member 3003, the rod structure 3001 is inserted and in the second hole 3007 the interchangeable adaptor end tool is fixed using the fastening mechanism.

In FIG. 36B, the interchangeable adaptor end tool 3003 shows a first plate 3004 and a second plate 3005 separated by a pre-defined gap. The proximal end of the stake is inserted in the pre-defined gap. In an embodiment, at least one distal edges of each of the first plate 3004 and the second plate 3005 have a slanted structure and the distal edges of each of the first plate 3004 and the second plate 3005 are not connected to each other. The slanted structure of the distal edges is visible in cut section as shown in FIG. 36B.

FIGS. 37 E-H show sectional views of different interchangeable adaptor end tools that are detachably connected to the offset member using a fastening mechanism, in accordance with one embodiment of the present disclosure.

Figure 37E:
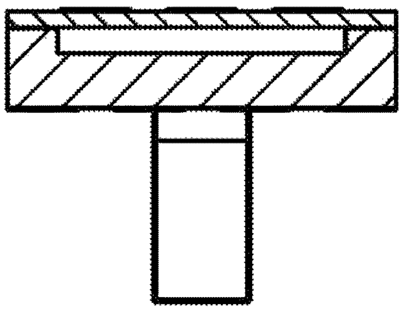
FIGS. 37 A-D show a back view of the reciprocating ram structure and FIG. 37E shows a sectional view, taken generally along line 37E-37E in FIG. 37A.
Figure 37F:
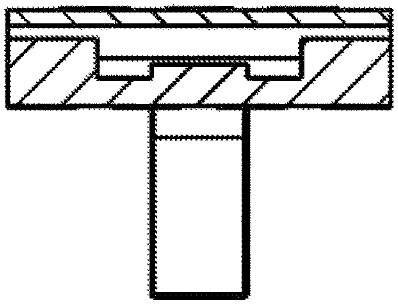
FIG. 37F shows a sectional view taken generally along line 37F-37F in FIG. 37B.
Figure 37A:
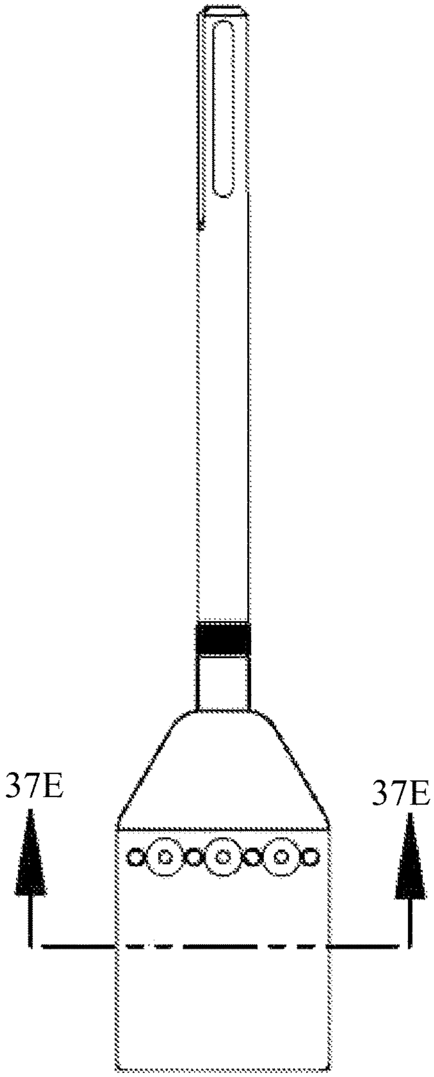
FIG. 37G shows a sectional view taken generally along line 37G-37G in FIG. 37C.
FIG. 37H shows a sectional view taken generally along line 37H-37H in FIG. 37D, of different interchangeable adaptor end tools that are detachably connected to the offset member using a fastening mechanism, in accordance with one embodiment of the present disclosure.
Figure 37B:
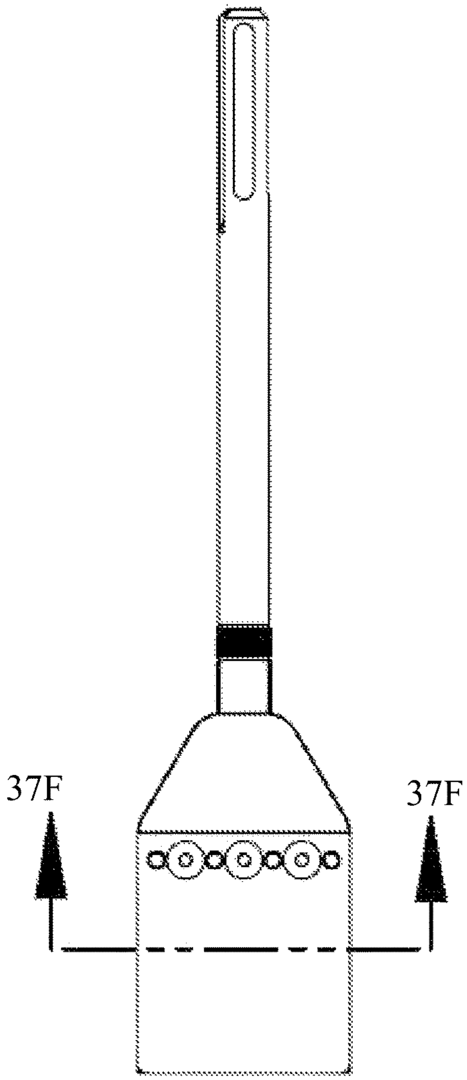
Figure 37G:
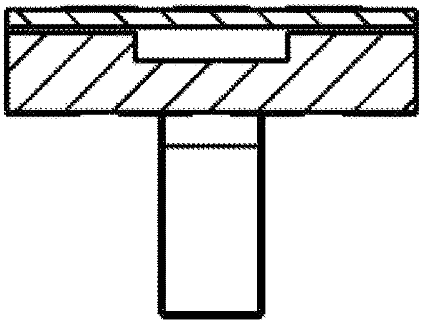

FIG. 37A shows a back view of the interchangeable adaptor end tool 3003 comprising a first plate 3004 and a second plate 3005. In an embodiment, the distal edge of the first plate 3004 has protrusions of pre-defined width at each corner of the distal edge. The pre-defined width of the protrusions is different as shown in sectional views FIG. 37 E and FIG. 37G. FIG. 37C also shows the interchangeable adaptor end tool 3003 comprising a first plate 3004 and a second plate 3005. In an embodiment, the distal edge of the first plate 3004 has protrusions of pre-defined width at each corner of the distal edge. The protrusions are in contact with the second plate 3005 thereby forming a rectangular gap between the first plate 3004, the second plate 3005 and the protrusions. Further, the proximal end of the stake is inserted in the rectangular gap. In an embodiment, the first plate 3004 and the second plate 3005 are generally rectangular.

FIG. 37F shows the interchangeable adaptor end tool 3003 comprising a first plate 3004 and a second plate 3005. The distal edge of the first plate 3004 has protrusions of pre-defined width at each corner of the distal edge and another protrusion of a pre-defined width at a center portion of the first plate 3004. The protrusions at each corner of the distal edge have a width greater than the protrusion at the center portion of the first plate 3004. The protrusions at each corner of the distal edge form a gap between the first plate 3004 and the second plate 3005. Further, the first plate 3004 has an E shaped structure when looked from a bottom side of the first plate 3004. The cut section of the first plate 3004 clearly shows in the E shaped structure and the gap between the first plate 3004 and the second plate 3005. Further, the proximal end of the stake is inserted in the gap.

Figure 37H:
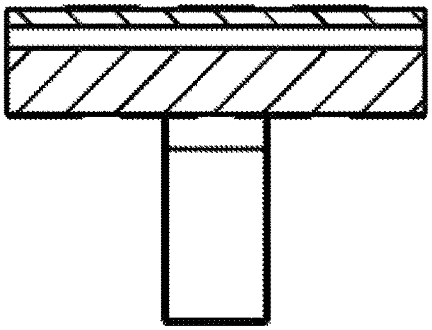
Figure 37C:
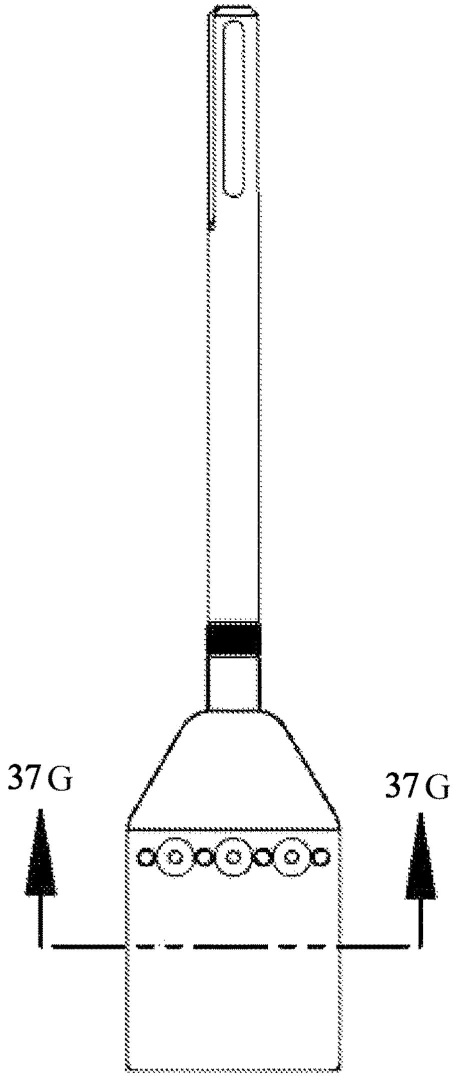
Figure 37D:
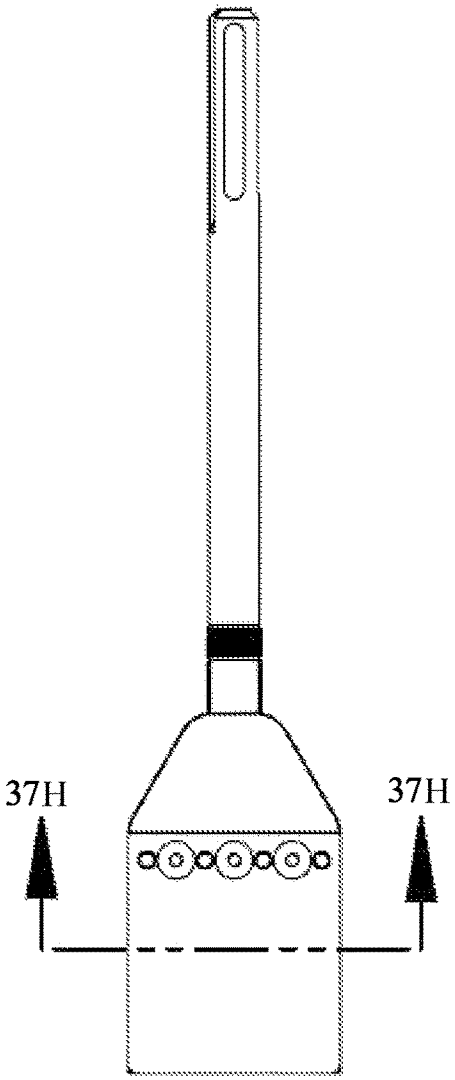

FIG. 37H shows the cut section interchangeable adaptor end tool 3003 comprising a first plate 3004 and a second plate 3005 separated by a pre-defined gap. The cut section clearly shows the pre-defined gap between the first plate 3004 and a second plate 3005. The proximal end of the stake is inserted in the pre-defined gap. In an embodiment, at least one distal edges of each of the first plate 3004 and the second plate 3005 have a slanted structure and the distal edges of each of the first plate 3004 and the second plate 3005 are not connected to each other.

FIG. 38A-D show front views of different stakes having different tapering end portions, in accordance with one embodiment of the present disclosure.

Figure 38A:
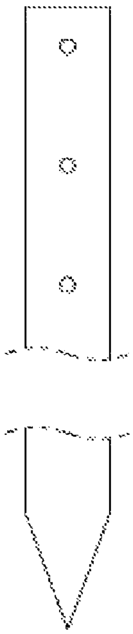
FIG. 38A-D show front views of different stakes having different tapering end portions, in accordance with one embodiment of the present disclosure.

FIG. 38A shows an exemplary stake having a plurality of holes at the proximal end and the distal end has a tapered sharp anchoring end. The tapered sharp anchoring end has an acute angle at the tip thereby making it easier to insert the stake in the ground. The tapered sharp anchoring end is inserted into the ground and the proximal end of the stake is inserted into the pre-defined gap of the interchangeable adaptor end tool 3003 which drives the stake using the power portion of the hammer mechanism into the ground using a reciprocating motion. The holes at the proximal end of the stake are used to screw in a plurality of screws into the post to provide additional support.

Figure 38B:

FIG. 38B shows an exemplary stake having at the proximal end and the distal end has a tapered sharp anchoring end. The stake shown in FIG. 38B does not have any holes for providing additional support to the post being repaired. The tapered sharp anchoring end has a 45 degree angle at the tip thereby making it easier to insert the stake in the ground. The 45 degree tapered sharp anchoring end is inserted into the ground and the proximal end of the stake is inserted into the pre-defined gap of the interchangeable adaptor end tool 3003 which drives the stake using the power portion of the hammer mechanism into the ground using a reciprocating motion.

Figure 38C:
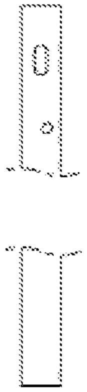

FIG. 38C shows an exemplary stake having a plurality of holes at the proximal end and the distal end has a flat anchoring end. The holes at the proximal end of stake include an elongated rounded edged rectangle and another circular hole for providing support to the post using variety of joining mechanism. For example, a peg may be inserted through the elongated rounded edged rectangle into the post to provide additional support and the using the hole a regular nail may be inserted. The proximal end of the stake is inserted into the pre-defined gap of the interchangeable adaptor end tool 3003 which drives the stake using the power portion of the hammer mechanism into the ground using a reciprocating motion.

Figure 38D:
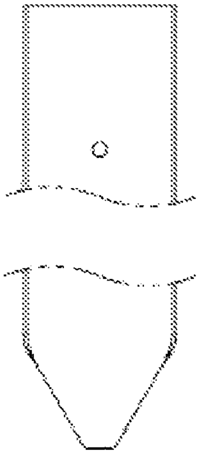

FIG. 38D shows an exemplary stake having a single hole at the proximal end and the distal end has a tapered anchoring end but rather than having pointed end it has a flat end. Such a type of stake can easily be driven into the ground at the time it does not possess a risk of injury to the operator as the stake has a flat/blunt end. The tapered anchoring stake has an acute angle at the tip thereby making it easier to insert the stake in the ground. The tapered anchoring stake with the flat end is inserted into the ground and the proximal end of the stake is inserted into the pre-defined gap of the interchangeable adaptor end tool 3003 which drives the stake using the power portion of the hammer mechanism into the ground using a reciprocating motion. The single hole at the proximal end of the stake is used to screw in a bolt into the post to provide additional support.

Figure 39:
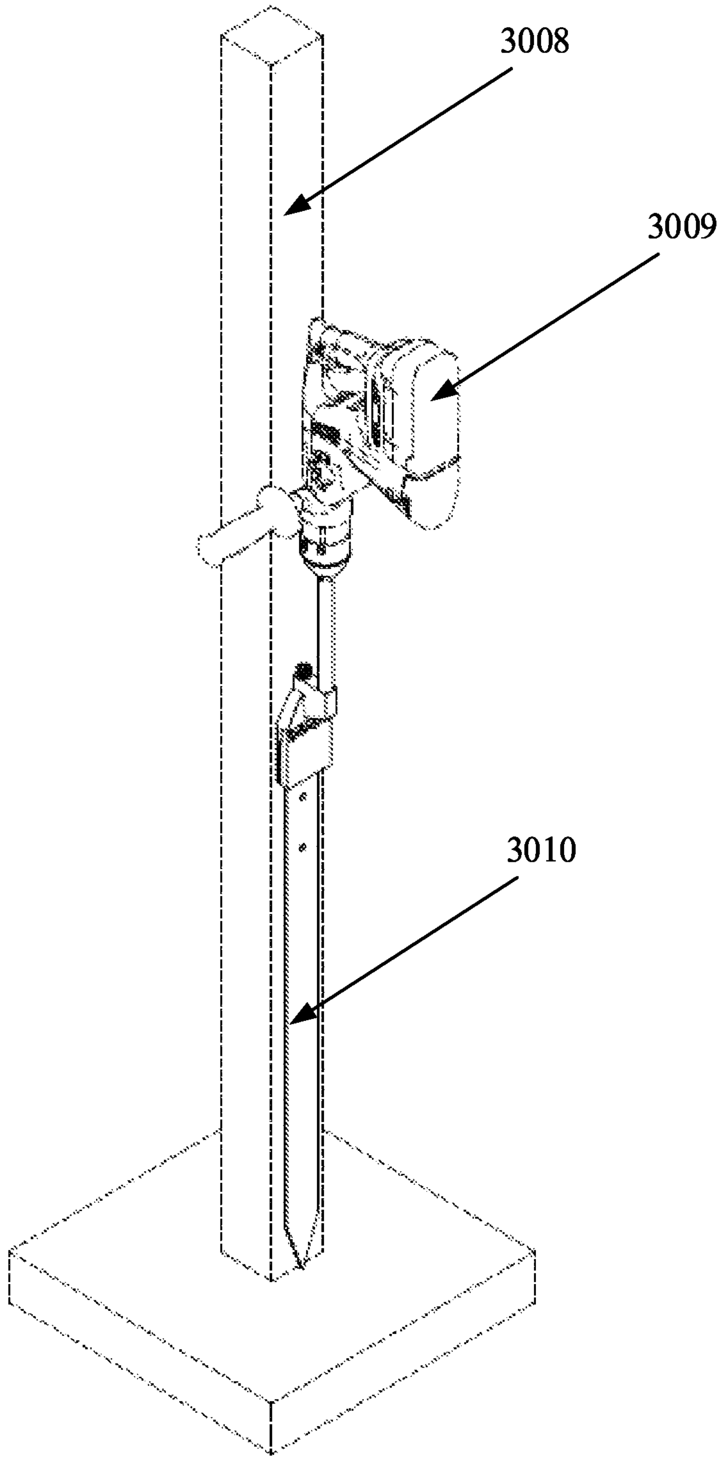
FIG. 39 shows a perspective view of the reciprocating ram structure being used to repair the post for driving the stake in the ground using a hammer mechanism, in accordance with one embodiment of the present disclosure.

FIG. 39 shows a perspective view of the reciprocating ram structure being used to repair the post for driving the stake in the ground using a hammer mechanism, in accordance with one embodiment of the present disclosure.

The post 3008 is to be fixed/repaired and provided support. In order to repair the post, the operator aligns a stake 3010 parallel and adjacent to one side of the post 3008. In an embodiment, the stake is defined by a body, proximal end, and a tapered anchor end, the body of the stake comprising at least one hole at the proximal end of the stake. Further, the operator couples a hammer mechanism 3009 to the proximal end of the stake 3010 through a reciprocating ram structure. The reciprocating ram structure comprises a rod structure having a proximal end coupled with the power portion of the hammer mechanism 3009

The offset member is connected to a distal end of the rod structure and the offset member has a first hole and a second hole. The distal end of the rod structure is connected to the first hole. Further, the offset member and the rod structure are connected perpendicular to each other. The interchangeable adaptor end tool is detachably connected to the offset member using a fastening mechanism at the second hole.

Figure 40:
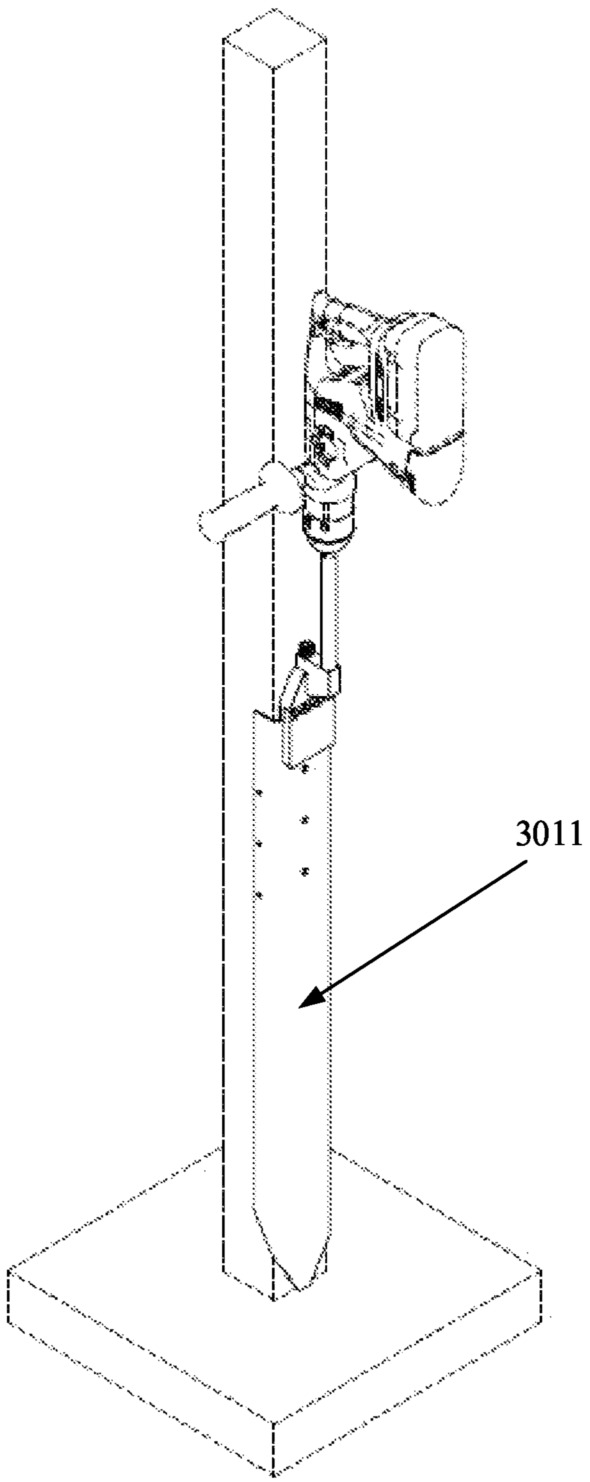
FIG. 40 shows a perspective view of the reciprocating ram structure being used to repair the post for driving a C-shaped stake in the ground using the hammer mechanism, in accordance with one embodiment of the present disclosure.

After the interchangeable adaptor end tool is connected, then the proximal end of the stake is inserted in to the pre-defined gap between the first plate and the second plate of the interchangeable adaptor end tool. Further, the operator performs driving, with the hammer mechanism 3009, the stake 3010 into a ground surface. Next at least one fastener is aligned with the at least one fastener hole in the stake 3010 and driving, with a fastening mechanism, the at least one fastener through the at least one fastener hole to provide additional support to the post 3008. In an embodiment, FIG. 40 shows a perspective view of the reciprocating ram structure being used to repair the post for driving a C-shaped stake 3011 in the ground using the hammer mechanism, in accordance with one embodiment of the present disclosure. The C-shaped stake 3011 covers at least 3 sides of the post and used to provide better stability and support to the post being repaired.

Various embodiments of the invention provide method and device for repairing a post. The disclosed invention provides a reciprocating ram structure having an offset member connected to a distal end of the rod structure. The offset member helps to drive the stake in a more efficient and an accurate manner as compared to a mere straight stake being inserted into reciprocating ram structure that is aligned in the same axis. Further, the detachable interchangeable adaptor end tools provide flexibility to the operator to use the ends as per the convenience and as per the proximal end of the stake. Additionally, the different structures of the first plate in the interchangeable adaptor end tool help to increase the gripping force and avoid any kind of skipping that might happen during the reciprocating motion.

In view of the above, the claimed steps and claimed structure as discussed above are not routine, conventional, or well understood in the art, as the claimed steps enable the following solutions to the existing problems in conventional technologies.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A post repair kit, the kit comprising:

a stake defined by a body, proximal end, and a tapered anchor end, the body of the stake comprising at least one hole at the proximal end of the stake;

a hammer mechanism comprising a power portion and a reciprocating ram structure, the power portion forcibly driving the reciprocating ram structure in a reciprocating motion; and the reciprocating ram structure comprising:

a rod structure having a proximal end coupled with the power portion;

an offset member connected to a distal end of the rod structure, wherein the offset member has a first hole and a second hole, wherein the distal end of the rod structure is connected to the first hole, wherein the offset member and the rod structure are connected perpendicular to each other;

an interchangeable adaptor end tool detachably connected to the offset member at the second hole.

2. The post repair kit of claim 1, wherein the offset member having a first region and a second region, wherein the height of the first region is greater than the second region, wherein the first region corresponds to a region below the first hole and the second region corresponds to a region below the second hole.

3. The post repair kit of claim 2, wherein the interchangeable adaptor end tool is supported by the first region of the offset member.

4. The post repair kit of claim 1, wherein the stake is defined by one of a flat rectangular structure, a C-shaped tubular structure, or a U shaped structure.

5. The post repair kit of claim 1, wherein the interchangeable adaptor end tool comprises a first plate and a second plate separated by a pre-defined gap having an open end and a closed end, wherein the proximal end of the stake is inserted in the open end in the pre-defined gap, wherein at least one distal edge of each of the first plate and the second plate have a slanted structure at the open end of the pre-defined gap.

6. The post repair kit of claim 1, wherein the interchangeable adaptor end tool comprises a first plate and a second plate, wherein a distal edge of the first plate has protrusions of pre-defined width at corners of the distal edge, wherein the protrusions are in contact with the second plate thereby forming a rectangular gap between the first plate, the second plate and the protrusions, wherein the proximal end of the stake is inserted in the rectangular gap.

7. The post repair kit of claim 1, wherein the interchangeable adaptor end tool comprises a first plate and a second plate, wherein a distal edge of the first plate has protrusions of pre-defined width at corners of the distal edge and another protrusion of a pre-defined width at a center portion of the first plate, wherein the protrusions at each corner of the distal edge have a width greater than the protrusion at the center portion of the first plate, wherein the protrusions at each corner of the distal edge form a gap between the first plate and the second plate, wherein the first plate has a E shaped structure when looked from a bottom side of the first plate, wherein the proximal end of the stake is inserted in the gap.

8. The post repair kit of claim 1, wherein a gap created between the first plate and the second plate being sized and dimensioned to detachably couple to the proximal end of the stake.

9. The post repair kit of claim 1, wherein a gap has a depth minimally greater than a depth of the stake, such that the interchangeable adaptor end tool can be placed over the stake.

10. The post repair kit of claim 1, wherein the first plate and the second plate are generally rectangular.

11. The post repair kit of claim 1, wherein at least one screw is drilled in a post to be repaired through at least one hole at the proximal end of the stake.

12. A method for repairing a post, the method comprising:

aligning a stake parallel and adjacent to the post, the stake defined by a body, proximal end, and a tapered anchor end, the body of the stake comprising at least one fastener hole at the proximal end of the stake;

coupling a hammer mechanism to the proximal end of the stake through a reciprocating ram structure, the reciprocating ram structure comprising:

a rod structure having a proximal end coupled with a power portion;

an offset member connected to a distal end of the rod structure, wherein the offset member has a first hole and a second hole, wherein the distal end of the rod structure is connected to the first hole, wherein the offset member and the rod structure are connected perpendicular to each other;

an interchangeable adaptor end tool detachably connected to the offset member at the second hole;

driving, with the hammer mechanism, the stake into a ground surface;

aligning at least one fastener with the at least one fastener hole in the stake; and driving at least one fastener through the at least one fastener hole.

* * * * *